US009495382B2

(12) United States Patent
Agrawal et al.

(10) Patent No.: US 9,495,382 B2
(45) Date of Patent: Nov. 15, 2016

(54) SYSTEMS AND METHODS FOR PERFORMING DISCRETE DATA REPLICATION

(75) Inventors: Vijay H. Agrawal, Eatontown, NJ (US); Anand Prahlad, East Brunswick, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 956 days.

(21) Appl. No.: 12/634,135

(22) Filed: Dec. 9, 2009

(65) Prior Publication Data

US 2010/0179941 A1    Jul. 15, 2010

Related U.S. Application Data

(60) Provisional application No. 61/121,438, filed on Dec. 10, 2008.

(51) Int. Cl.
*G06F 17/30* (2006.01)
*G06F 11/14* (2006.01)

(52) U.S. Cl.
CPC ..... *G06F 17/30212* (2013.01); *G06F 11/1451* (2013.01); *G06F 11/1464* (2013.01); *G06F 17/30191* (2013.01); *G06F 2201/84* (2013.01)

(58) Field of Classification Search
CPC .............. G06F 17/30365; G06F 17/30575; G06F 17/30578; G06F 17/30581; G06F 17/30088; G06F 17/30191
USPC ....... 707/654, 646, 641, 643, 644, 645, 649, 707/650
See application file for complete search history.

(56) References Cited

U.S. PATENT DOCUMENTS 4,296,465 A    10/1981 Lemak
4,686,620 A    8/1987 Ng
(Continued)

FOREIGN PATENT DOCUMENTS

AU    2006331932    12/2006
CA    2632935    12/2006
(Continued)

OTHER PUBLICATIONS

Ashton, et al., "Two Decades of policy-based storage management for the IBM mainframe computer", www.research.ibm.com, 19 pages, published Apr. 10, 2003, printed Jan. 3, 2009—cited in U.S. Appl. No. 12/276,868., www.research.ibm.com, Apr. 10, 2003, pp. 19.
(Continued)

*Primary Examiner* — James Trujillo
*Assistant Examiner* — Fatima Mina
(74) *Attorney, Agent, or Firm* — Knobbe, Martens, Olson & Bear, LLP

(57) ABSTRACT

Systems and methods for performing intelligent replication of production data on a source storage device. In certain examples, a full backup of the production data is first performed and stored on a destination system. A journal module on the storage device (e.g., a shared storage device), or on at least one source system, tracks files on the storage device that change during a particular period of time. Following this period, a snapshot is taken of the production data. Upon mounting the snapshot, the replication system uses the journal information to identify modified files, conduct a block-level comparison of only the modified files with corresponding files on the destination system, and identify the particular data blocks that changed. The replication system then replicates only the changed blocks to the destination system. Certain systems further store information indicating a source system time of a known good state of the production data.

17 Claims, 6 Drawing Sheets

(56) References Cited

U.S. PATENT DOCUMENTS

| | | |
|---|---|---|
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,231,668 A | 7/1993 | Kravitz |
| 5,239,647 A | 8/1993 | Anglin et al. |
| 5,241,668 A | 8/1993 | Eastridge et al. |
| 5,241,670 A | 8/1993 | Eastridge et al. |
| 5,263,154 A | 11/1993 | Eastridge et al. |
| 5,265,159 A | 11/1993 | Kung |
| 5,276,860 A | 1/1994 | Fortier et al. |
| 5,276,867 A | 1/1994 | Kenley et al. |
| 5,287,500 A | 2/1994 | Stoppani, Jr. |
| 5,301,351 A | 4/1994 | Jippo |
| 5,311,509 A | 5/1994 | Heddes et al. |
| 5,317,731 A | 5/1994 | Dias et al. |
| 5,321,816 A | 6/1994 | Rogan et al. |
| 5,333,315 A | 7/1994 | Saether et al. |
| 5,347,653 A | 9/1994 | Flynn et al. |
| 5,369,757 A | 11/1994 | Spiro et al. |
| 5,403,639 A | 4/1995 | Belsan et al. |
| 5,410,700 A | 4/1995 | Fecteau et al. |
| 5,448,724 A | 9/1995 | Hayashi et al. |
| 5,455,926 A | 10/1995 | Keele et al. |
| 5,487,072 A | 1/1996 | Kant |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,546,536 A | 8/1996 | Davis et al. |
| 5,555,404 A | 9/1996 | Torbjornsen et al. |
| 5,559,957 A | 9/1996 | Balk |
| 5,559,991 A | 9/1996 | Kanfi |
| 5,598,546 A | 1/1997 | Blomgren |
| 5,604,862 A | 2/1997 | Midgely et al. |
| 5,606,693 A | 2/1997 | Nilsen et al. |
| 5,615,392 A | 3/1997 | Harrison et al. |
| 5,619,644 A | 4/1997 | Crockett et al. |
| 5,638,509 A | 6/1997 | Dunphy et al. |
| 5,642,496 A | 6/1997 | Kanfi |
| 5,668,986 A | 9/1997 | Nilsen et al. |
| 5,673,381 A | 9/1997 | Huai et al. |
| 5,675,511 A | 10/1997 | Prasad et al. |
| 5,677,900 A | 10/1997 | Nishida et al. |
| 5,682,513 A | 10/1997 | Candelaria et al. |
| 5,687,343 A | 11/1997 | Fecteau et al. |
| 5,689,706 A | 11/1997 | Rao et al. |
| 5,699,361 A | 12/1997 | Ding et al. |
| 5,719,786 A | 2/1998 | Nelson et al. |
| 5,720,026 A | 2/1998 | Uemura et al. |
| 5,729,743 A | 3/1998 | Squibb |
| 5,737,747 A | 4/1998 | Vishlitsky et al. |
| 5,742,792 A | 4/1998 | Yanai et al. |
| 5,745,753 A | 4/1998 | Mosher, Jr. |
| 5,751,997 A | 5/1998 | Kullick et al. |
| 5,758,359 A | 5/1998 | Saxon |
| 5,761,677 A | 6/1998 | Senator et al. |
| 5,761,734 A | 6/1998 | Pfeffer et al. |
| 5,764,972 A | 6/1998 | Crouse et al. |
| 5,765,173 A | 6/1998 | Cane et al. |
| 5,778,395 A | 7/1998 | Whiting et al. |
| 5,790,114 A | 8/1998 | Geaghan et al. |
| 5,790,828 A | 8/1998 | Jost |
| 5,802,265 A | 9/1998 | Bressoud et al. |
| 5,805,920 A | 9/1998 | Sprenkle et al. |
| 5,812,398 A | 9/1998 | Nielsen |
| 5,813,009 A | 9/1998 | Johnson et al. |
| 5,813,017 A | 9/1998 | Morris |
| 5,829,046 A | 10/1998 | Tzelnic et al. |
| 5,860,104 A | 1/1999 | Witt et al. |
| 5,875,478 A | 2/1999 | Blumenau |
| 5,875,481 A | 2/1999 | Ashton et al. |
| 5,878,408 A | 3/1999 | Van Huben et al. |
| 5,887,134 A | 3/1999 | Ebrahim |
| 5,901,327 A | 5/1999 | Ofek |
| 5,907,621 A | 5/1999 | Bachman et al. |
| 5,907,672 A | 5/1999 | Matze et al. |
| 5,924,102 A | 7/1999 | Perks |
| 5,926,836 A | 7/1999 | Blumenau |
| 5,933,104 A | 8/1999 | Kimura |
| 5,933,601 A | 8/1999 | Fanshier et al. |
| 5,950,205 A | 9/1999 | Aviani, Jr. |
| 5,956,519 A | 9/1999 | Wise et al. |
| 5,958,005 A | 9/1999 | Thorne et al. |
| 5,970,233 A | 10/1999 | Lie et al. |
| 5,970,255 A | 10/1999 | Tran et al. |
| 5,974,563 A | 10/1999 | Beeler, Jr. |
| 5,987,478 A | 11/1999 | See et al. |
| 5,991,779 A | 11/1999 | Bejar |
| 5,995,091 A | 11/1999 | Near et al. |
| 6,003,089 A | 12/1999 | Shaffer et al. |
| 6,009,274 A | 12/1999 | Fletcher et al. |
| 6,012,090 A | 1/2000 | Chung et al. |
| 6,021,415 A | 2/2000 | Cannon et al. |
| 6,021,475 A | 2/2000 | Nguyen et al. |
| 6,023,710 A | 2/2000 | Steiner et al. |
| 6,026,414 A | 2/2000 | Anglin |
| 6,049,889 A | 4/2000 | Steely, Jr. et al. |
| 6,052,735 A | 4/2000 | Ulrich et al. |
| 6,058,066 A | 5/2000 | Norris et al. |
| 6,061,692 A | 5/2000 | Thomas et al. |
| 6,072,490 A | 6/2000 | Bates et al. |
| 6,076,148 A | 6/2000 | Kedem et al. |
| 6,088,697 A | 7/2000 | Crockett et al. |
| 6,094,416 A | 7/2000 | Ying |
| 6,105,129 A | 8/2000 | Meier et al. |
| 6,112,239 A | 8/2000 | Kenner et al. |
| 6,122,668 A | 9/2000 | Teng et al. |
| 6,131,095 A | 10/2000 | Low et al. |
| 6,131,148 A | 10/2000 | West et al. |
| 6,131,190 A | 10/2000 | Sidwell |
| 6,137,864 A | 10/2000 | Yaker |
| 6,148,377 A | 11/2000 | Carter et al. |
| 6,148,412 A | 11/2000 | Cannon et al. |
| 6,154,787 A | 11/2000 | Urevig et al. |
| 6,154,852 A | 11/2000 | Amundson et al. |
| 6,158,044 A | 12/2000 | Tibbetts |
| 6,161,111 A | 12/2000 | Mutalik et al. |
| 6,163,856 A | 12/2000 | Dion et al. |
| 6,167,402 A | 12/2000 | Yeager |
| 6,175,829 B1 | 1/2001 | Li et al. |
| 6,195,695 B1 | 2/2001 | Cheston et al. |
| 6,205,450 B1 | 3/2001 | Kanome et al. |
| 6,212,512 B1 | 4/2001 | Barney et al. |
| 6,212,521 B1 | 4/2001 | Minami et al. |
| 6,230,164 B1 | 5/2001 | Rikieta et al. |
| 6,260,068 B1 | 7/2001 | Zalewski et al. |
| 6,260,069 B1 | 7/2001 | Anglin |
| 6,269,431 B1 | 7/2001 | Dunham |
| 6,275,953 B1 | 8/2001 | Vahalia et al. |
| 6,279,078 B1 | 8/2001 | Sicola et al. |
| 6,292,783 B1 | 9/2001 | Rohler |
| 6,301,592 B1 | 10/2001 | Aoyama et al. |
| 6,304,880 B1 | 10/2001 | Kishi |
| 6,311,193 B1 | 10/2001 | Sekido et al. |
| 6,324,581 B1 | 11/2001 | Xu et al. |
| 6,328,766 B1 | 12/2001 | Long |
| 6,330,570 B1 | 12/2001 | Crighton et al. |
| 6,330,642 B1 | 12/2001 | Carteau |
| 6,343,324 B1 | 1/2002 | Hubis et al. |
| 6,350,199 B1 | 2/2002 | Williams et al. |
| RE37,601 E | 3/2002 | Eastridge et al. |
| 6,353,878 B1 | 3/2002 | Dunham |
| 6,356,801 B1 | 3/2002 | Goodman et al. |
| 6,363,464 B1 | 3/2002 | Mangione |
| 6,366,986 B1 | 4/2002 | St. Pierre et al. |
| 6,366,988 B1 | 4/2002 | Skiba et al. |
| 6,374,336 B1 | 4/2002 | Peters et al. |
| 6,374,363 B1 | 4/2002 | Wu et al. |
| 6,389,432 B1 | 5/2002 | Pothapragada et al. |

(56) References Cited

U.S. PATENT DOCUMENTS

| | | |
|---|---|---|
| 6,397,308 B1 | 5/2002 | Ofek et al. |
| 6,418,478 B1 | 7/2002 | Ignatius et al. |
| 6,421,711 B1 | 7/2002 | Blumenau et al. |
| 6,434,681 B1 | 8/2002 | Armangau |
| 6,438,595 B1 | 8/2002 | Blumenau et al. |
| 6,466,950 B1 | 10/2002 | Ono |
| 6,473,775 B1 | 10/2002 | Kusters et al. |
| 6,487,561 B1 | 11/2002 | Ofek et al. |
| 6,487,644 B1 | 11/2002 | Huebsch et al. |
| 6,487,645 B1 | 11/2002 | Clark et al. |
| 6,502,205 B1 | 12/2002 | Yanai et al. |
| 6,516,314 B1 | 2/2003 | Birkler et al. |
| 6,516,327 B1 | 2/2003 | Zondervan et al. |
| 6,516,348 B1 | 2/2003 | MacFarlane et al. |
| 6,519,679 B2 | 2/2003 | Devireddy et al. |
| 6,538,669 B1 | 3/2003 | Lagueux, Jr. et al. |
| 6,539,462 B1 | 3/2003 | Mikkelsen et al. |
| 6,542,468 B1 | 4/2003 | Hatakeyama |
| 6,542,909 B1 | 4/2003 | Tamer et al. |
| 6,542,972 B2 | 4/2003 | Ignatius et al. |
| 6,564,228 B1 | 5/2003 | O'Connor |
| 6,564,229 B1 | 5/2003 | Baweja et al. |
| 6,564,271 B2 | 5/2003 | Micalizzi, Jr. et al. |
| 6,581,143 B2 | 6/2003 | Gagne et al. |
| 6,604,118 B2 | 8/2003 | Kleinman et al. |
| 6,604,149 B1 | 8/2003 | Deo et al. |
| 6,611,849 B1 | 8/2003 | Raff et al. |
| 6,615,223 B1 | 9/2003 | Shih et al. |
| 6,629,189 B1 | 9/2003 | Sandstrom |
| 6,631,477 B1 | 10/2003 | LeCrone et al. |
| 6,631,493 B2 | 10/2003 | Ottesen et al. |
| 6,647,396 B2 | 11/2003 | Parnell et al. |
| 6,647,473 B1 | 11/2003 | Golds et al. |
| 6,651,075 B1 | 11/2003 | Kusters et al. |
| 6,654,825 B2 | 11/2003 | Clapp et al. |
| 6,658,436 B2 | 12/2003 | Oshinsky et al. |
| 6,658,526 B2 | 12/2003 | Nguyen et al. |
| 6,662,198 B2 | 12/2003 | Satyanarayanan et al. |
| 6,665,815 B1 | 12/2003 | Goldstein et al. |
| 6,681,230 B1 | 1/2004 | Blott et al. |
| 6,691,209 B1 | 2/2004 | O'Connell |
| 6,721,767 B2 | 4/2004 | De Meno et al. |
| 6,728,733 B2 | 4/2004 | Tokui |
| 6,732,124 B1 | 5/2004 | Koseki et al. |
| 6,732,125 B1 | 5/2004 | Autrey et al. |
| 6,742,092 B1 | 5/2004 | Huebsch et al. |
| 6,748,504 B2 | 6/2004 | Sawdon et al. |
| 6,751,635 B1 | 6/2004 | Chen et al. |
| 6,757,794 B2 | 6/2004 | Cabrera et al. |
| 6,760,723 B2 | 7/2004 | Oshinsky et al. |
| 6,763,351 B1 | 7/2004 | Subramaniam et al. |
| 6,789,161 B1 | 9/2004 | Blendermann et al. |
| 6,792,472 B1 | 9/2004 | Otterness et al. |
| 6,792,518 B2 | 9/2004 | Armangau et al. |
| 6,799,258 B1 | 9/2004 | Linde |
| 6,820,035 B1 | 11/2004 | Zahavi |
| 6,836,779 B2 | 12/2004 | Poulin |
| 6,839,724 B2 | 1/2005 | Manchanda et al. |
| 6,871,163 B2 | 3/2005 | Hiller et al. |
| 6,871,271 B2 | 3/2005 | Ohran et al. |
| 6,880,051 B2 | 4/2005 | Timpanaro-Perrotta |
| 6,886,020 B1 | 4/2005 | Zahavi et al. |
| 6,892,211 B2 | 5/2005 | Hitz et al. |
| 6,912,482 B2 | 6/2005 | Kaiser |
| 6,925,476 B1 | 8/2005 | Multer et al. |
| 6,925,512 B2 | 8/2005 | Louzoun et al. |
| 6,938,135 B1 | 8/2005 | Kekre et al. |
| 6,938,180 B1 | 8/2005 | Dysert et al. |
| 6,941,393 B2 | 9/2005 | Secatch |
| 6,944,796 B2 | 9/2005 | Joshi et al. |
| 6,952,705 B2 | 10/2005 | Knoblock et al. |
| 6,952,758 B2 | 10/2005 | Chron et al. |
| 6,954,834 B2 | 10/2005 | Slater et al. |
| 6,968,351 B2 | 11/2005 | Butterworth |
| 6,973,553 B1 | 12/2005 | Archibald, Jr. et al. |
| 6,978,265 B2 | 12/2005 | Schumacher |
| 6,981,177 B2 | 12/2005 | Beattie |
| 6,983,351 B2 | 1/2006 | Gibble et al. |
| 6,993,539 B2 | 1/2006 | Federwisch et al. |
| 7,003,519 B1 | 2/2006 | Biettron et al. |
| 7,003,641 B2 | 2/2006 | Prahlad et al. |
| 7,007,046 B2 | 2/2006 | Manley et al. |
| 7,020,669 B2 | 3/2006 | McCann et al. |
| 7,032,131 B2 | 4/2006 | Lubbers et al. |
| 7,035,880 B1 | 4/2006 | Crescenti et al. |
| 7,039,661 B1 | 5/2006 | Ranade |
| 7,051,050 B2 | 5/2006 | Chen et al. |
| 7,062,761 B2 | 6/2006 | Slavin et al. |
| 7,065,538 B2 | 6/2006 | Aronoff et al. |
| 7,068,597 B1 | 6/2006 | Fijolek et al. |
| 7,082,441 B1 | 7/2006 | Zahavi et al. |
| 7,085,787 B2 | 8/2006 | Beier et al. |
| 7,085,904 B2 | 8/2006 | Mizuno et al. |
| 7,093,012 B2 | 8/2006 | Olstad et al. |
| 7,096,315 B2 | 8/2006 | Takeda et al. |
| 7,103,731 B2 | 9/2006 | Gibble et al. |
| 7,103,740 B1 | 9/2006 | Colgrove et al. |
| 7,106,691 B1 | 9/2006 | Decaluwe et al. |
| 7,107,298 B2 | 9/2006 | Prahlad et al. |
| 7,107,395 B1 | 9/2006 | Ofek et al. |
| 7,111,021 B1 | 9/2006 | Lewis et al. |
| 7,120,757 B2 | 10/2006 | Tsuge |
| 7,130,860 B2 | 10/2006 | Pachet |
| 7,130,970 B2 | 10/2006 | Devassy et al. |
| 7,139,932 B2 | 11/2006 | Watanabe |
| 7,155,465 B2 | 12/2006 | Lee et al. |
| 7,155,633 B2 | 12/2006 | Tuma et al. |
| 7,158,985 B1 | 1/2007 | Liskov |
| 7,177,866 B2 | 2/2007 | Holenstein et al. |
| 7,181,477 B2 | 2/2007 | Saika et al. |
| 7,188,292 B2 | 3/2007 | Cordina et al. |
| 7,191,198 B2 | 3/2007 | Asano et al. |
| 7,194,454 B2 | 3/2007 | Hansen et al. |
| 7,194,487 B1 | 3/2007 | Kekre et al. |
| 7,200,620 B2 | 4/2007 | Gupta |
| 7,203,807 B2 | 4/2007 | Urabe et al. |
| 7,209,972 B1 | 4/2007 | Ignatius et al. |
| 7,225,204 B2 | 5/2007 | Manley et al. |
| 7,225,208 B2 | 5/2007 | Midgley et al. |
| 7,225,210 B2 | 5/2007 | Guthrie, II. |
| 7,228,456 B2 | 6/2007 | Lecrone et al. |
| 7,231,391 B2 | 6/2007 | Aronoff et al. |
| 7,231,544 B2 | 6/2007 | Tan et al. |
| 7,234,115 B1 | 6/2007 | Sprauve et al. |
| 7,246,140 B2 | 7/2007 | Therrien et al. |
| 7,246,207 B2 | 7/2007 | Kottomtharayil et al. |
| 7,250,963 B2 | 7/2007 | Yuri et al. |
| 7,257,689 B1 | 8/2007 | Baird |
| 7,269,612 B2 | 9/2007 | Devarakonda et al. |
| 7,269,641 B2 | 9/2007 | Powers et al. |
| 7,272,606 B2 | 9/2007 | Borthakur et al. |
| 7,275,138 B2 | 9/2007 | Saika |
| 7,275,177 B2 | 9/2007 | Armangau et al. |
| 7,278,142 B2 | 10/2007 | Bandhole et al. |
| 7,284,153 B2 | 10/2007 | Okbay et al. |
| 7,287,047 B2 | 10/2007 | Kavuri |
| 7,293,133 B1 | 11/2007 | Colgrove et al. |
| 7,296,125 B2 | 11/2007 | Ohran |
| 7,315,923 B2 | 1/2008 | Retnamma et al. |
| 7,318,134 B1 | 1/2008 | Oliveira et al. |
| 7,340,652 B2 | 3/2008 | Jarvis et al. |
| 7,343,356 B2 | 3/2008 | Prahlad et al. |
| 7,343,365 B2 | 3/2008 | Farnham et al. |
| 7,343,453 B2 | 3/2008 | Prahlad et al. |
| 7,343,459 B2 | 3/2008 | Prahlad et al. |
| 7,346,623 B2 | 3/2008 | Prahlad et al. |
| 7,346,751 B2 | 3/2008 | Prahlad et al. |
| 7,356,657 B2 | 4/2008 | Mikami |
| 7,359,917 B2 | 4/2008 | Winter et al. |
| 7,363,444 B2 | 4/2008 | Ji |
| 7,370,232 B2 | 5/2008 | Safford |
| 7,373,364 B1 | 5/2008 | Chapman |
| 7,380,072 B2 | 5/2008 | Kottomtharayil et al. |
| 7,383,293 B2 | 6/2008 | Gupta et al. |

(56) References Cited

U.S. PATENT DOCUMENTS

| | | |
|---|---|---|
| 7,389,311 B1 | 6/2008 | Crescenti et al. |
| 7,392,360 B1 | 6/2008 | Aharoni et al. |
| 7,395,282 B1 | 7/2008 | Crescenti et al. |
| 7,401,064 B1 | 7/2008 | Arone et al. |
| 7,409,509 B2 | 8/2008 | Devassy et al. |
| 7,415,488 B1 | 8/2008 | Muth et al. |
| 7,428,657 B2 | 9/2008 | Yamasaki |
| 7,430,587 B2 | 9/2008 | Malone et al. |
| 7,433,301 B2 | 10/2008 | Akahane et al. |
| 7,440,982 B2 | 10/2008 | Lu et al. |
| 7,457,980 B2 | 11/2008 | Yang et al. |
| 7,461,230 B1 | 12/2008 | Gupta et al. |
| 7,464,236 B2 | 12/2008 | Sano et al. |
| 7,467,167 B2 | 12/2008 | Patterson |
| 7,467,267 B1 | 12/2008 | Mayock |
| 7,469,262 B2 | 12/2008 | Baskaran et al. |
| 7,472,238 B1 | 12/2008 | Gokhale |
| 7,472,312 B2 | 12/2008 | Jarvis et al. |
| 7,475,284 B2 | 1/2009 | Koike |
| 7,490,207 B2 | 2/2009 | Amarendran et al. |
| 7,496,589 B1 | 2/2009 | Jain et al. |
| 7,496,690 B2 | 2/2009 | Beverly et al. |
| 7,500,053 B1 | 3/2009 | Kavuri et al. |
| 7,500,150 B2 | 3/2009 | Sharma et al. |
| 7,502,902 B2 | 3/2009 | Sato |
| 7,509,316 B2 | 3/2009 | Greenblatt et al. |
| 7,512,601 B2 | 3/2009 | Cucerzan et al. |
| 7,516,088 B2 | 4/2009 | Johnson et al. |
| 7,523,483 B2 | 4/2009 | Dogan |
| 7,529,745 B2 | 5/2009 | Ahluwalia et al. |
| 7,529,748 B2 | 5/2009 | Wen et al. |
| 7,529,782 B2 | 5/2009 | Prahlad et al. |
| 7,529,898 B2 | 5/2009 | Nguyen et al. |
| 7,532,340 B2 | 5/2009 | Koppich et al. |
| 7,533,181 B2 | 5/2009 | Dawson et al. |
| 7,536,291 B1 | 5/2009 | Retnamma et al. |
| 7,539,707 B2 | 5/2009 | Prahlad et al. |
| 7,539,835 B2 | 5/2009 | Kaiser |
| 7,543,125 B2 | 6/2009 | Gokhale |
| 7,546,324 B2 | 6/2009 | Prahlad et al. |
| 7,546,364 B2 | 6/2009 | Raman et al. |
| 7,552,358 B1 | 6/2009 | Asgar-Deen et al. |
| 7,565,572 B2 | 7/2009 | Yamasaki |
| 7,581,077 B2 | 8/2009 | Ignatius et al. |
| 7,590,668 B2 | 9/2009 | Kathuria et al. |
| 7,593,966 B2 | 9/2009 | Therrien et al. |
| 7,596,586 B2 | 9/2009 | Gokhale et al. |
| 7,606,841 B1 | 10/2009 | Ranade |
| 7,606,844 B2 | 10/2009 | Kottomtharayil |
| 7,607,037 B1 | 10/2009 | LeCrone et al. |
| 7,613,748 B2 | 11/2009 | Brockway et al. |
| 7,613,750 B2 | 11/2009 | Valiyaparambil et al. |
| 7,617,253 B2 | 11/2009 | Prahlad et al. |
| 7,617,262 B2 | 11/2009 | Prahlad et al. |
| 7,617,321 B2 | 11/2009 | Clark |
| 7,617,369 B1 | 11/2009 | Bezbaruah et al. |
| 7,617,541 B2 | 11/2009 | Plotkin et al. |
| 7,627,598 B1 | 12/2009 | Burke |
| 7,627,617 B2 | 12/2009 | Kavuri et al. |
| 7,634,477 B2 | 12/2009 | Hinshaw |
| 7,636,743 B2 | 12/2009 | Erofeev |
| 7,651,593 B2 | 1/2010 | Prahlad et al. |
| 7,661,028 B2 | 2/2010 | Erofeev |
| 7,668,798 B2 | 2/2010 | Scanlon et al. |
| 7,669,029 B1 | 2/2010 | Mishra et al. |
| 7,672,979 B1 | 3/2010 | Appellof et al. |
| 7,673,000 B2 | 3/2010 | Smoot et al. |
| 7,685,126 B2 | 3/2010 | Patel |
| 7,689,467 B1 | 3/2010 | Belanger et al. |
| 7,694,086 B1 | 4/2010 | Bezbaruah et al. |
| 7,702,533 B2 | 4/2010 | Barnard et al. |
| 7,702,670 B1 | 4/2010 | Duprey et al. |
| 7,707,184 B1 | 4/2010 | Zhang et al. |
| 7,716,171 B2 | 5/2010 | Kryger |
| 7,734,715 B2 | 6/2010 | Hyakutake et al. |
| 7,739,235 B2 | 6/2010 | Rousseau et al. |
| 7,809,691 B1 | 10/2010 | Karmarkar et al. |
| 7,810,067 B2 | 10/2010 | Kaelicke et al. |
| 7,831,553 B2 | 11/2010 | Prahlad et al. |
| 7,831,622 B2 | 11/2010 | Prahlad et al. |
| 7,840,533 B2 | 11/2010 | Prahlad et al. |
| 7,870,355 B2 | 1/2011 | Erofeev |
| 7,904,681 B1 | 3/2011 | Bappe |
| 7,930,476 B1 | 4/2011 | Castelli et al. |
| 7,962,455 B2 | 6/2011 | Erofeev |
| 7,962,709 B2 | 6/2011 | Agrawal |
| 8,005,795 B2 | 8/2011 | Galipeau et al. |
| 8,024,294 B2 | 9/2011 | Kottomtharayil |
| 8,121,983 B2 | 2/2012 | Prahlad et al. |
| 8,190,565 B2 | 5/2012 | Prahlad et al. |
| 8,195,623 B2 | 6/2012 | Prahlad et al. |
| 8,271,830 B2 | 9/2012 | Erofeev |
| 8,285,684 B2 | 10/2012 | Prahlad et al. |
| 8,291,101 B1 | 10/2012 | Yan et al. |
| 8,352,422 B2 | 1/2013 | Prahlad et al. |
| 8,463,751 B2 | 6/2013 | Kottomtharayil |
| 8,489,656 B2 | 7/2013 | Erofeev |
| 8,504,515 B2 | 8/2013 | Prahlad et al. |
| 8,504,517 B2 | 8/2013 | Agrawal |
| 8,572,038 B2 | 10/2013 | Erofeev |
| 8,589,347 B2 | 11/2013 | Erofeev |
| 8,655,850 B2 | 2/2014 | Ngo et al. |
| 8,656,218 B2 | 2/2014 | Erofeev |
| 8,666,942 B2 | 3/2014 | Ngo |
| 8,725,694 B2 | 5/2014 | Kottomtharayil |
| 8,725,698 B2 | 5/2014 | Prahlad et al. |
| 8,726,242 B2 | 5/2014 | Ngo |
| 8,745,105 B2 | 6/2014 | Erofeev |
| 8,793,221 B2 | 7/2014 | Prahlad et al. |
| 8,805,818 B2 | 8/2014 | Zane et al. |
| 8,868,494 B2 | 10/2014 | Agrawal |
| 8,935,210 B2 | 1/2015 | Kottomtharayil |
| 9,002,785 B2 | 4/2015 | Prahlad et al. |
| 9,002,799 B2 | 4/2015 | Ngo et al. |
| 9,003,374 B2 | 4/2015 | Ngo |
| 9,020,898 B2 | 4/2015 | Prahlad et al. |
| 9,047,357 B2 | 6/2015 | Ngo |
| 9,208,210 B2 | 12/2015 | Erofeev |
| 9,298,382 B2 | 3/2016 | Kottomtharayil |
| 2001/0029512 A1 | 10/2001 | Oshinsky et al. |
| 2001/0029517 A1 | 10/2001 | De Meno et al. |
| 2001/0032172 A1 | 10/2001 | Moulinet et al. |
| 2001/0035866 A1 | 11/2001 | Finger et al. |
| 2001/0042222 A1 | 11/2001 | Kedem et al. |
| 2001/0044807 A1 | 11/2001 | Kleiman et al. |
| 2002/0002557 A1 | 1/2002 | Straube et al. |
| 2002/0004883 A1 | 1/2002 | Nguyen et al. |
| 2002/0019909 A1 | 2/2002 | D'Errico |
| 2002/0023051 A1 | 2/2002 | Kunzle et al. |
| 2002/0040376 A1 | 4/2002 | Yamanaka et al. |
| 2002/0042869 A1 | 4/2002 | Tate et al. |
| 2002/0049626 A1 | 4/2002 | Mathias et al. |
| 2002/0049718 A1 | 4/2002 | Kleiman et al. |
| 2002/0049738 A1 | 4/2002 | Epstein |
| 2002/0049778 A1 | 4/2002 | Bell et al. |
| 2002/0062230 A1 | 5/2002 | Morag et al. |
| 2002/0069324 A1 | 6/2002 | Gerasimov et al. |
| 2002/0083055 A1 | 6/2002 | Pachet et al. |
| 2002/0091712 A1 | 7/2002 | Martin et al. |
| 2002/0103848 A1 | 8/2002 | Giacomini et al. |
| 2002/0107877 A1 | 8/2002 | Whiting et al. |
| 2002/0112134 A1 | 8/2002 | Ohran et al. |
| 2002/0120741 A1 | 8/2002 | Webb et al. |
| 2002/0124137 A1 | 9/2002 | Ulrich et al. |
| 2002/0133511 A1 | 9/2002 | Hostetter |
| 2002/0133512 A1 | 9/2002 | Milillo et al. |
| 2002/0161753 A1 | 10/2002 | Inaba et al. |
| 2002/0174107 A1 | 11/2002 | Poulin |
| 2002/0174139 A1* | 11/2002 | Midgley et al. ............... 707/204 |
| 2002/0174416 A1 | 11/2002 | Bates et al. |
| 2002/0181395 A1 | 12/2002 | Foster et al. |
| 2003/0005119 A1 | 1/2003 | Mercier et al. |
| 2003/0018657 A1 | 1/2003 | Monday |
| 2003/0023893 A1 | 1/2003 | Lee et al. |

(56) References Cited

U.S. PATENT DOCUMENTS

| | | |
|---|---|---|
| 2003/0028736 A1 | 2/2003 | Berkowitz et al. |
| 2003/0033308 A1 | 2/2003 | Patel et al. |
| 2003/0061491 A1 | 3/2003 | Jaskiewicz et al. |
| 2003/0079018 A1 | 4/2003 | Lolayekar et al. |
| 2003/0097296 A1 | 5/2003 | Putt |
| 2003/0126200 A1 | 7/2003 | Wolff |
| 2003/0131278 A1 | 7/2003 | Fujibayashi |
| 2003/0135783 A1 | 7/2003 | Martin et al. |
| 2003/0161338 A1 | 8/2003 | Ng et al. |
| 2003/0167380 A1 | 9/2003 | Green et al. |
| 2003/0177149 A1 | 9/2003 | Coombs |
| 2003/0177321 A1 | 9/2003 | Watanabe |
| 2003/0182312 A1* | 9/2003 | Chen .................. G06F 11/1435 |
| 2003/0187847 A1 | 10/2003 | Lubbers et al. |
| 2003/0225800 A1 | 12/2003 | Kavuri |
| 2004/0006572 A1 | 1/2004 | Hoshino et al. |
| 2004/0006578 A1 | 1/2004 | Yu |
| 2004/0010487 A1 | 1/2004 | Prahlad et al. |
| 2004/0015468 A1 | 1/2004 | Beier et al. |
| 2004/0039679 A1 | 2/2004 | Norton et al. |
| 2004/0078632 A1 | 4/2004 | Infante et al. |
| 2004/0098425 A1 | 5/2004 | Wiss et al. |
| 2004/0107199 A1 | 6/2004 | Dalrymple et al. |
| 2004/0117438 A1 | 6/2004 | Considine et al. |
| 2004/0117572 A1 | 6/2004 | Welsh et al. |
| 2004/0133634 A1 | 7/2004 | Luke et al. |
| 2004/0139128 A1 | 7/2004 | Becker et al. |
| 2004/0158588 A1 | 8/2004 | Pruet |
| 2004/0193625 A1 | 9/2004 | Sutoh |
| 2004/0193953 A1 | 9/2004 | Callahan et al. |
| 2004/0205206 A1 | 10/2004 | Naik et al. |
| 2004/0212639 A1 | 10/2004 | Smoot et al. |
| 2004/0215724 A1 | 10/2004 | Smoot et al. |
| 2004/0225437 A1 | 11/2004 | Endo et al. |
| 2004/0230615 A1 | 11/2004 | Blanco et al. |
| 2004/0230829 A1 | 11/2004 | Dogan et al. |
| 2004/0236958 A1 | 11/2004 | Teicher et al. |
| 2004/0249883 A1 | 12/2004 | Srinivasan et al. |
| 2004/0250033 A1 | 12/2004 | Prahlad et al. |
| 2004/0254919 A1 | 12/2004 | Giuseppini |
| 2004/0260678 A1 | 12/2004 | Verbowski et al. |
| 2004/0267777 A1 | 12/2004 | Sugimura et al. |
| 2004/0267835 A1 | 12/2004 | Zwilling et al. |
| 2004/0267836 A1 | 12/2004 | Armangau et al. |
| 2005/0015409 A1 | 1/2005 | Cheng et al. |
| 2005/0027892 A1 | 2/2005 | McCabe et al. |
| 2005/0033800 A1 | 2/2005 | Kavuri et al. |
| 2005/0044114 A1 | 2/2005 | Kottomtharayil et al. |
| 2005/0055445 A1 | 3/2005 | Gupta et al. |
| 2005/0060613 A1 | 3/2005 | Cheng |
| 2005/0071389 A1 | 3/2005 | Gupta et al. |
| 2005/0071391 A1 | 3/2005 | Fuerderer et al. |
| 2005/0080928 A1 | 4/2005 | Beverly et al. |
| 2005/0086443 A1 | 4/2005 | Mizuno et al. |
| 2005/0108292 A1 | 5/2005 | Burton et al. |
| 2005/0114406 A1 | 5/2005 | Borthakur et al. |
| 2005/0131900 A1 | 6/2005 | Palliyll et al. |
| 2005/0138306 A1 | 6/2005 | Panchbudhe et al. |
| 2005/0144202 A1 | 6/2005 | Chen |
| 2005/0172073 A1 | 8/2005 | Voigt |
| 2005/0187982 A1 | 8/2005 | Sato |
| 2005/0187992 A1 | 8/2005 | Prahlad et al. |
| 2005/0188109 A1 | 8/2005 | Shiga et al. |
| 2005/0188254 A1 | 8/2005 | Urabe et al. |
| 2005/0193026 A1 | 9/2005 | Prahlad et al. |
| 2005/0198083 A1 | 9/2005 | Saika et al. |
| 2005/0228875 A1 | 10/2005 | Monitzer et al. |
| 2005/0246376 A1 | 11/2005 | Lu et al. |
| 2005/0246510 A1 | 11/2005 | Retnamma et al. |
| 2005/0254456 A1 | 11/2005 | Sakai |
| 2005/0268068 A1 | 12/2005 | Ignatius et al. |
| 2006/0005048 A1 | 1/2006 | Osaki et al. |
| 2006/0010154 A1 | 1/2006 | Prahlad et al. |
| 2006/0010227 A1 | 1/2006 | Atluri |
| 2006/0010341 A1 | 1/2006 | Kodama |
| 2006/0020616 A1 | 1/2006 | Hardy et al. |
| 2006/0034454 A1* | 2/2006 | Damgaard et al. ............. 380/28 |
| 2006/0036901 A1 | 2/2006 | Yang et al. |
| 2006/0047805 A1 | 3/2006 | Byrd et al. |
| 2006/0047931 A1 | 3/2006 | Saika |
| 2006/0092861 A1 | 5/2006 | Corday et al. |
| 2006/0107089 A1 | 5/2006 | Jansz et al. |
| 2006/0120401 A1 | 6/2006 | Harada et al. |
| 2006/0129537 A1 | 6/2006 | Torii et al. |
| 2006/0136685 A1 | 6/2006 | Griv et al. |
| 2006/0155946 A1 | 7/2006 | Ji |
| 2006/0171315 A1 | 8/2006 | Choi et al. |
| 2006/0174075 A1 | 8/2006 | Sutoh |
| 2006/0215564 A1 | 9/2006 | Breitgand et al. |
| 2006/0230244 A1 | 10/2006 | Amarendran et al. |
| 2006/0242371 A1 | 10/2006 | Shono et al. |
| 2006/0242489 A1 | 10/2006 | Brockway et al. |
| 2007/0033437 A1 | 2/2007 | Kawamura |
| 2007/0043956 A1 | 2/2007 | El Far et al. |
| 2007/0050547 A1 | 3/2007 | Sano |
| 2007/0055737 A1 | 3/2007 | Yamashita et al. |
| 2007/0094467 A1 | 4/2007 | Yamasaki |
| 2007/0100867 A1 | 5/2007 | Celik et al. |
| 2007/0112897 A1 | 5/2007 | Asano et al. |
| 2007/0113006 A1 | 5/2007 | Elliott et al. |
| 2007/0124347 A1 | 5/2007 | Vivian et al. |
| 2007/0124348 A1 | 5/2007 | Claborn et al. |
| 2007/0130373 A1 | 6/2007 | Kalwitz |
| 2007/0143371 A1 | 6/2007 | Kottomtharayil |
| 2007/0143756 A1 | 6/2007 | Gokhale |
| 2007/0179990 A1 | 8/2007 | Zimran et al. |
| 2007/0183224 A1 | 8/2007 | Erofeev |
| 2007/0185852 A1 | 8/2007 | Erofeev |
| 2007/0185937 A1 | 8/2007 | Prahlad et al. |
| 2007/0185938 A1* | 8/2007 | Prahlad et al. ............... 707/204 |
| 2007/0185939 A1 | 8/2007 | Prahlad et al. |
| 2007/0185940 A1 | 8/2007 | Prahlad et al. |
| 2007/0186042 A1 | 8/2007 | Kottomtharayil et al. |
| 2007/0186068 A1 | 8/2007 | Agrawal |
| 2007/0198602 A1* | 8/2007 | Ngo et al. .................... 707/201 |
| 2007/0226438 A1 | 9/2007 | Erofeev |
| 2007/0233756 A1 | 10/2007 | D'Souza et al. |
| 2007/0244571 A1 | 10/2007 | Wilson et al. |
| 2007/0260609 A1 | 11/2007 | Tulyani |
| 2007/0276848 A1 | 11/2007 | Kim |
| 2007/0288536 A1 | 12/2007 | Sen et al. |
| 2008/0016126 A1 | 1/2008 | Kottomtharayil et al. |
| 2008/0016293 A1 | 1/2008 | Saika |
| 2008/0028009 A1 | 1/2008 | Ngo |
| 2008/0059515 A1 | 3/2008 | Fulton |
| 2008/0077634 A1 | 3/2008 | Quakenbush |
| 2008/0077636 A1 | 3/2008 | Gupta et al. |
| 2008/0103916 A1 | 5/2008 | Camarador et al. |
| 2008/0104357 A1 | 5/2008 | Kim et al. |
| 2008/0114815 A1 | 5/2008 | Sutoh |
| 2008/0147878 A1 | 6/2008 | Kottomtharayil et al. |
| 2008/0183775 A1 | 7/2008 | Prahlad et al. |
| 2008/0205301 A1 | 8/2008 | Burton et al. |
| 2008/0208933 A1* | 8/2008 | Lyon ........................... 707/204 |
| 2008/0228987 A1 | 9/2008 | Yagi |
| 2008/0229037 A1 | 9/2008 | Bunte et al. |
| 2008/0243879 A1 | 10/2008 | Gokhale et al. |
| 2008/0243914 A1 | 10/2008 | Prahlad et al. |
| 2008/0243957 A1 | 10/2008 | Prahlad et al. |
| 2008/0243958 A1 | 10/2008 | Prahlad et al. |
| 2008/0244177 A1 | 10/2008 | Crescenti et al. |
| 2008/0244205 A1* | 10/2008 | Amano et al. ................. 711/162 |
| 2008/0250178 A1 | 10/2008 | Haustein et al. |
| 2008/0306954 A1 | 12/2008 | Hornqvist |
| 2008/0313497 A1 | 12/2008 | Hirakawa |
| 2009/0013014 A1 | 1/2009 | Kern |
| 2009/0044046 A1 | 2/2009 | Yamasaki |
| 2009/0113056 A1 | 4/2009 | Tameshige et al. |
| 2009/0150462 A1 | 6/2009 | McClanahan et al. |
| 2009/0182963 A1 | 7/2009 | Prahlad et al. |
| 2009/0187944 A1 | 7/2009 | White et al. |
| 2009/0300079 A1 | 12/2009 | Shitomi |
| 2009/0319534 A1 | 12/2009 | Gokhale |
| 2009/0319585 A1 | 12/2009 | Gokhale |

(56) References Cited

U.S. PATENT DOCUMENTS

| | | |
|---|---|---|
| 2010/0005259 A1 | 1/2010 | Prahlad |
| 2010/0049753 A1 | 2/2010 | Prahlad et al. |
| 2010/0094808 A1 | 4/2010 | Erofeev |
| 2010/0100529 A1 | 4/2010 | Erofeev |
| 2010/0122053 A1 | 5/2010 | Prahlad et al. |
| 2010/0131461 A1 | 5/2010 | Prahlad et al. |
| 2010/0131467 A1 | 5/2010 | Prahlad et al. |
| 2010/0145909 A1 | 6/2010 | Ngo |
| 2010/0153338 A1 | 6/2010 | Ngo et al. |
| 2010/0179941 A1 | 7/2010 | Agrawal et al. |
| 2010/0205150 A1 | 8/2010 | Prahlad et al. |
| 2010/0211571 A1 | 8/2010 | Prahlad et al. |
| 2011/0066599 A1 | 3/2011 | Prahlad et al. |
| 2011/0238621 A1 | 9/2011 | Agrawal |
| 2011/0246416 A1 | 10/2011 | Prahlad et al. |
| 2011/0246429 A1 | 10/2011 | Prahlad et al. |
| 2011/0246430 A1 | 10/2011 | Prahlad et al. |
| 2011/0295804 A1 | 12/2011 | Erofeev |
| 2011/0295806 A1 | 12/2011 | Erofeev |
| 2012/0011336 A1 | 1/2012 | Saika |
| 2012/0030171 A1 | 2/2012 | Kottomtharayil |
| 2012/0317074 A1 | 12/2012 | Ngo |
| 2013/0006926 A1 | 1/2013 | Erofeev |
| 2013/0006938 A1 | 1/2013 | Prahlad et al. |
| 2013/0006942 A1 | 1/2013 | Prahlad et al. |
| 2014/0067764 A1 | 3/2014 | Prahlad et al. |
| 2014/0074777 A1 | 3/2014 | Agrawal |
| 2014/0164327 A1 | 6/2014 | Ngo et al. |
| 2014/0181022 A1 | 6/2014 | Ngo |
| 2014/0181029 A1 | 6/2014 | Erofeev |
| 2014/0236900 A1 | 8/2014 | Kottomtharayil |
| 2014/0244586 A1 | 8/2014 | Ngo |
| 2015/0186061 A1 | 7/2015 | Kottomtharayil |
| 2015/0199375 A1 | 7/2015 | Prahlad et al. |
| 2015/0205853 A1 | 7/2015 | Ngo |
| 2015/0248444 A1 | 9/2015 | Prahlad et al. |

FOREIGN PATENT DOCUMENTS

| | | |
|---|---|---|
| EP | 0259912 | 3/1988 |
| EP | 0405926 | 1/1991 |
| EP | 0 467 546 | 1/1992 |
| EP | 0 774 715 | 5/1997 |
| EP | 0809184 | 11/1997 |
| EP | 0862304 | 9/1998 |
| EP | 0 899 662 | 3/1999 |
| EP | 0 981 090 | 2/2000 |
| EP | 0981090 | 2/2000 |
| EP | 1174795 | 1/2002 |
| EP | 1349089 | 1/2003 |
| EP | 1349088 | 10/2003 |
| EP | 1579331 | 9/2005 |
| EP | 1974296 | 10/2008 |
| GB | 2256952 | 12/1992 |
| GB | 2411030 | 8/2005 |
| JP | 05189281 | 7/1993 |
| JP | 06274605 | 9/1994 |
| JP | 09016463 | 1/1997 |
| JP | 11259348 | 9/1999 |
| JP | 200347811 | 12/2000 |
| WO | WO 93/03549 | 2/1993 |
| WO | WO 95/13580 | 5/1995 |
| WO | WO 98/39707 | 9/1998 |
| WO | WO 99/12098 | 3/1999 |
| WO | WO 99/14692 | 3/1999 |
| WO | WO 99/12098 | 11/1999 |
| WO | WO 02/095632 A | 11/2002 |
| WO | WO 03/028183 | 4/2003 |
| WO | WO 2004/034197 | 4/2004 |
| WO | WO 2005/055093 | 6/2005 |
| WO | WO 2005/086032 | 9/2005 |
| WO | WO 2007/053314 | 5/2007 |
| WO | WO 2007/075587 | 7/2007 |
| WO | WO 2010/068570 | 6/2010 |

OTHER PUBLICATIONS

Cabrera et al., "ADSM: A Multi-Platform, Scalable, Backup and Archive Mass Storage System," Digest of Papers of the Computer Society Conference, IEEE Comp. Soc. Press, vol. Conf. (Mar. 5, 1995), pp. 420-427.

European Examination Report; Application No. 06848901.2, Apr. 1, 2009, pp. 7.

http://en.wikipedia.org/wiki/Naive_Bayes_classifier.

International Search Report and Written Opinion; dated Mar. 25, 2010; International Application No. PCT/US2009/066880; 10 pages.

International Search Report from International Application No. PCT/US2006/048273, dated May 15, 2007.

Microsoft Corporation, "Microsoft Exchange Server: Best Practices for Exchange Database Management," 1998.

PCT International Search Report and Written Opinion for International Application No. PCT/US07/81681, Mail Date Nov. 13, 2009, 8 pages.

GRAY (#2 of 2, pp. 604-609), Jim; Reuter Andreas, Transaction Processing Concepts and Techniques, Morgan Kaufmann Publisher, USA 1994, pp. 604-609.

International Search Report, PCT/US2004/038324, dated Dec. 28, 2009.

International Search Report, PCT/US2004/038455 dated Jan. 11, 2006.

International Search Report and Written Opinion dated Nov. 13, 2009, PCT/US2007/081681.

Second Examination Report in EU Appl. No. 06 848 901.2-2201 dated Dec. 3, 2010.

U.S. Appl. No. 12/433,238, filed Apr. 30, 2009, Prahlad et al.

Examiner's First Report; Application No. 2006331932 May 11, 2011 in 2 pages.

Final Office Action for U.S. Appl. No. 12/407,906, mail date Jul. 11, 2011, 38 pages.

Gray, et al. "Transaction processing: concepts and techniques" 1994, Morgan Kaufmann Publishers, USA, pp. 604-609, 646-655.

Harrington, Lisa H., "The RFP Process: How to Hire a Third Party", Transportation & Distribution, Sep. 1988, vol. 39, Issue 9, in 5 pages.

International Preliminary Report on Patentability, PCT Application No. PCT/US2009/066880, mailed Jun. 23, 2011, in 9 pages.

International Search Report and Written Opinion issued in PCT Application No. PCT/US2011/030396, mailed Jul. 18, 2011, in 20 pages.

International Search Report and Written Opinion issued in PCT Application No. PCT/US2011/38436, mailed Sep. 21, 2011, in 18 pages.

Kashyap, et al., "Professional Services Automation: A knowledge Management approach using LSI and Domain specific Ontologies", FLAIRS-01 Proceedings, 2001, pp. 300-302.

Notice of Allowance for U.S. Appl. No. 12/581,297, Mail Date May 13, 2011, 23 pages.

Notice of Allowance for U.S. Appl. No. 12/951,773, Mail Date Oct. 4, 2011, 8 pages.

Armstead et al.; "Implementation of a Campus-wide Distributed Mass Storage Service: The Dream vs. Reality," IEEE, 1995, pp. 190-199.

Arneson, "Mass Storage Archiving in Network Environments" IEEE, 1998, pp. 45-50.

Arneson, David A., Control Data Corporation, Development of Omniserver; Mass Storage Systems, 1990, pp. 88-93.

Cabrera et al., "ADSM: A Multi-Platform, Scalable, Backup and Archive Mass Storage System," Digest of Papers, Compcon '95, Proceedings of the 40th IEEE Computer Society International Conference, Mar. 5-9, 1995, pp. 420-427, San Francisco, CA.

Eitel, "Backup and Storage Management in Distributed Heterogeneous Environments," IEEE, 1994, pp. 124-126.

Gray, Jim, Reuter, Andreas: "Transaction Processing: Concepts and Techniques" 1994, Morgan Kaufmann Publisher, USA; pp. 646-655.

(56) References Cited

OTHER PUBLICATIONS

Jander, M., "Launching Storage-Area Net," Data Communications, US, McGraw Hill, NY, vol. 27, No. 4 (Mar. 21, 1998), pp. 64-72.
Jason Gait, "The Optical File Cabinet: A Random-Access File system for Write-Once Optical Disks," IEEE Computer, vol. 21, No. 6, pp. 11-22 (1988) (see in particular figure 5 in p. 15 and the recitation in claim 5).
Lyon J., Design considerations in replicated database systems for disaster protection, COMPCON 1988, Feb. 29, 1988, pp. 428-430.
Rosenblum et al., "The Design and Implementation of a Log-Structure File System," Operating Systems Review SIGOPS, vol. 25, No. 5, New York, US, pp. 1-15 (May 1991).
The Oracle8 Replication Manual, Part No. A58245-01; Chapters 1-2; Dec. 1, 1997; obtained from website: http://download-west.oracle.com/docs/cd/A64702_01/doc/server.805/a58245/toc.htm on May 20, 2009.
Wiesmann M, Database replication techniques: a three parameter classification, Oct. 16, 2000, pp. 206-215.
Armstead et al., "Implementation of a Campus-Wide Distributed Mass Storage Service: The Dream vs. Reality," IEEE, 1995, pp. 190-199.
Arneson, "Development of Omniserver; Mass Storage Systems," Control Data Corporation, 1990, pp. 88-93.
Calvert, Andrew, "SQL Server 2005 Snapshots", published Apr. 3, 2006, http:/www.simple-talk.com/contnet/print.aspx?article=137, 6 pages.
Veritas Software Corporation, "Veritas Volume Manager 3.2, Administrator's Guide," Aug. 2001, 360 pages.
Final Office Action for Japanese Application No. 2003531581, Mail Date Mar. 24, 2009, 6 pages.
First Office Action for Japanese Application No. 2003531581, Mail Date Jul. 8, 2008, 8 pages.
Canadian Office Action dated Sep. 24, 2012, Application No. 2,632,935, 2 pages.
Canadian Office Action dated Dec. 29, 2010, Application No. CA2546304.
Examiner's Report for Australian Application No. 2003279847, Dated Dec. 9, 2008, 4 pages.
First Office Action in Canadian application No. 2,632,935 dated Feb. 16, 2012, 5 pages.
International Preliminary Report on Patentability and Written Opinion in PCT/US2011/030396 mailed Oct. 2, 2012.
International Search Report dated Dec. 28, 2009, PCT/US204/038324.
IBM, "Intelligent Selection of Logs Required During Recovery Processing", ip.com, Sep. 16, 2002, 4 pages.
IBM, "Near Zero Impact Backup and Data Replication Appliance", ip.com, Oct. 18, 2004, 5 pages.
Park, et al., "An Efficient Logging Scheme for Recoverable Distributed Shared Memory Systems", IEEE, 1997, 9 pages.
Exam Report in Australian Application No. 2009324800 dated Jun. 17, 2013.
U.S. Appl. No. 14/038,540, filed Sep. 26, 2013, Erofeev.
U.S. Appl. No. 14/592,770, filed Jan. 8, 2015, Kottomtharayil.
U.S. Appl. No. 14/645,982, filed Mar. 12, 2015, Prahlad, et al.
U.S. Appl. No. 14/668,752, filed Mar. 12, 2015, Prahlad, et al.

* cited by examiner

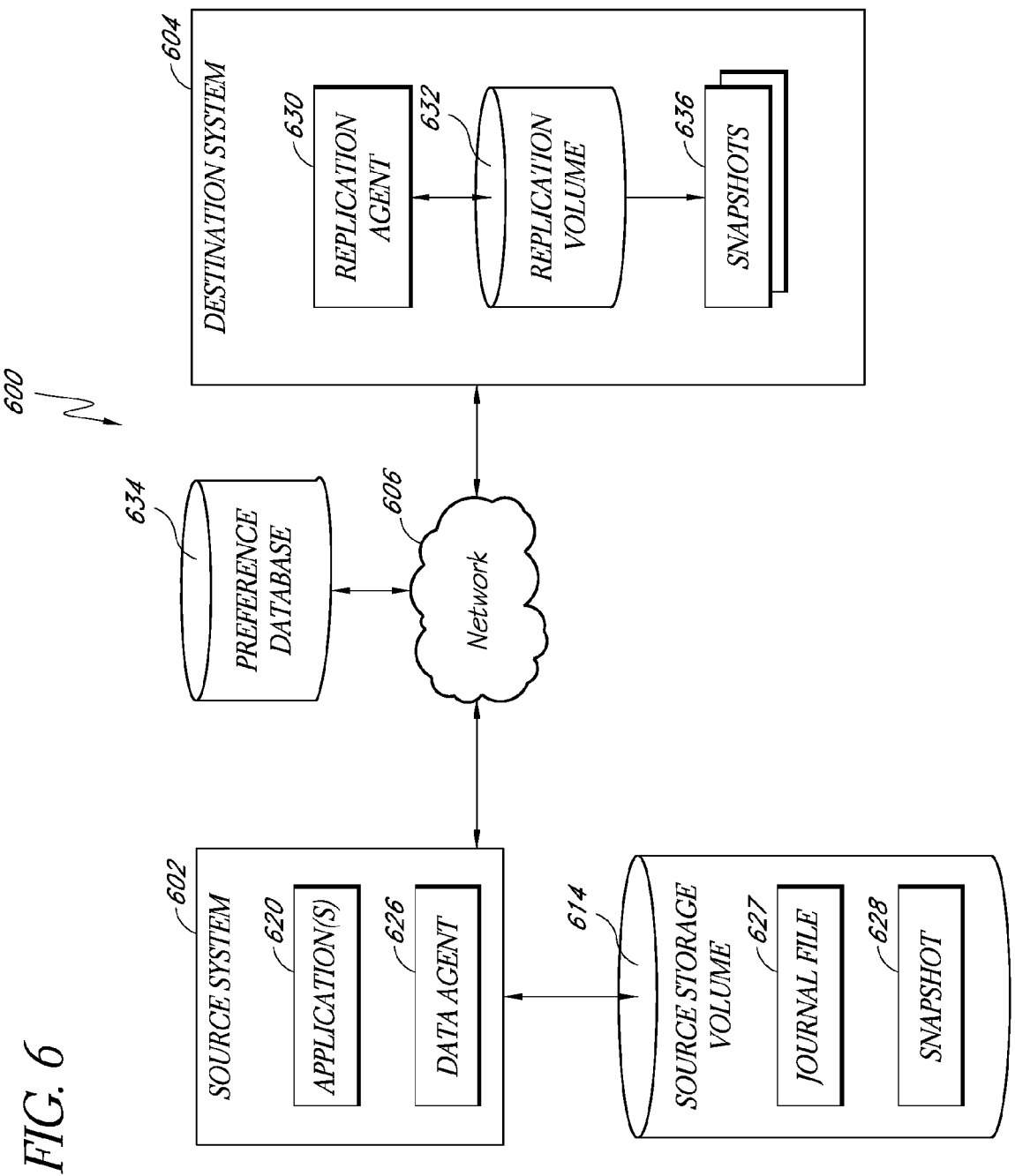

SYSTEMS AND METHODS FOR PERFORMING DISCRETE DATA REPLICATION

RELATED APPLICATION

This application claims the benefit of priority under 35 U.S.C. §119(e) of U.S. Provisional Patent Application No. 61/121,438, entitled "Systems and Methods for Performing Discrete Data Replication," filed Dec. 10, 2008, which is hereby incorporated herein by reference in its entirety to be considered part of this specification.

BACKGROUND

Field

The present disclosure relates to performing copy and/or data management operations in a computer network and, in particular, to systems and methods for performing data replication in a storage management system.

Description of the Related Art

Computers have become an integral part of business operations such that many banks, insurance companies, brokerage firms, financial service providers, and a variety of other businesses rely on computer networks to store, manipulate, and display information that is constantly subject to change. Oftentimes, the success or failure of an important transaction may turn on the availability of information that is both accurate and current. Accordingly, businesses worldwide recognize the commercial value of their data and seek reliable, cost-effective ways to protect the information stored on their computer networks.

Many approaches to protecting data involve creating a copy of the data, such as backing up and/or replicating data on one or more storage devices. Data shadowing and mirroring, or duplexing, provide for copying but can require substantial amounts of time, processing power and/or storage space, especially for large databases. Moreover, such storage management systems can have a significant adverse impact on the performance of the source or primary system.

To address these drawbacks, certain systems perform backup operations that copy less than an entire volume of data to a desired location. For example, differential backup operations are used to copy all files that have changed since a last full backup of the data. Moreover, incremental backup operations can be used to copy all files that have changed since the most recent full, differential or incremental backup. These techniques, however, can require a significant amount of processing power or network bandwidth, especially when dealing with changes to relatively large files or databases.

SUMMARY

In view of the foregoing, a need exists for improved systems and methods for copying and/or replicating data in computing systems. In particular, a need exists for intelligent systems and methods that reduce the amount of data replicated from a source volume to a destination volume, including replication of a shared storage volume. Such intelligent and focused data replication can advantageously reduce network loads, expedite copy operations and/or decrease consumption of valuable processing resources.

In certain embodiments of the invention, systems and methods are disclosed for performing discrete data replication of data (e.g., application-specific data) in a computer network environment. For instance, in certain embodiments only the changed blocks of a source file are replicated to a destination file. The time intervals of such replication can advantageously be selected and/or varied to balance the need to maintain current the replication data and to reduce network and processing loads.

Accordingly, certain embodiments of the invention can recognize one or more points within application data that represent known good state(s) of the application. This information is then used by the replication system to intelligently and/or timely replicate sections of application data that represent a recoverable state rather than the rote copying of certain blocks of data based on hardware capacity and/or criteria that are unrelated to application recoverability.

In certain embodiments, a method is disclosed for replicating data in a computer network. The method includes performing a full backup of source data comprising a plurality of source files on a source storage device to copy replication data to a destination storage device, the replication data comprising a plurality of destination files corresponding to the plurality of source files. Following the full backup, the method includes identifying changed source files by tracking at a logical level which of the plurality of source files changes between the full backup and a second time and performing a snapshot of the source data to capture a state, or point-in-time image, of the source data at the second time. The method further includes mounting the snapshot and, based on the mounted snapshot, comparing blocks of the changed source files with blocks of the corresponding destination files to detect changed blocks between the changed source files and the corresponding destination files. The method then includes replicating only the changed blocks to the replication data of the destination storage device.

In certain embodiments, a system is disclosed for performing data replication in a computer network environment. The system comprises a shared storage device for storing source data as a plurality of source files, a first source computing device having a first application operative to write data to the plurality of source files, a second source computing device having a second application operative to write data to the plurality of source files, and a journal module configured to identify changed source files by tracking logical changes to the plurality of source files on the shared storage device between a first time and a second time. The system further comprises a data agent module configured to: instruct a creation of a snapshot of the source data to capture a state of the source data at the second time; instruct a mounting of the snapshot; based on the mounted snapshot, compare blocks of the changed source files with blocks of corresponding replication files on a replication storage device to detect inconsistent blocks between the changed source files and the corresponding replication files, and transmit the detected inconsistent blocks to the replication storage device. In certain embodiments, the transmission is made without copying other (consistent) blocks of the source data.

In certain embodiments, a replication system is disclosed that includes means for storing source data accessible to both a first source computing device and a second source computing device, the source data being stored as a plurality of source files. The system further includes: means for performing a full backup of the source data at a first time, the full backup resulting in replication data being stored on a destination storage device, the replication data comprising a plurality of destination files corresponding to the plurality of source files; and means for tracking logical changes to the plurality of source files between the first time and a second time to identify changed source files. The method also includes means for mounting a snapshot capturing a state of the source data at the second time; means for comparing blocks of the changed source files with blocks of the corresponding destination files to detect changed blocks; and means for replicating only the changed blocks to the destination storage device.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

FIG. 6 illustrates a block diagram of a data replication system having a single source system, according to certain embodiments of the invention.

DETAILED DESCRIPTION OF THE PREFERRED EMBODIMENTS

Figure 1:
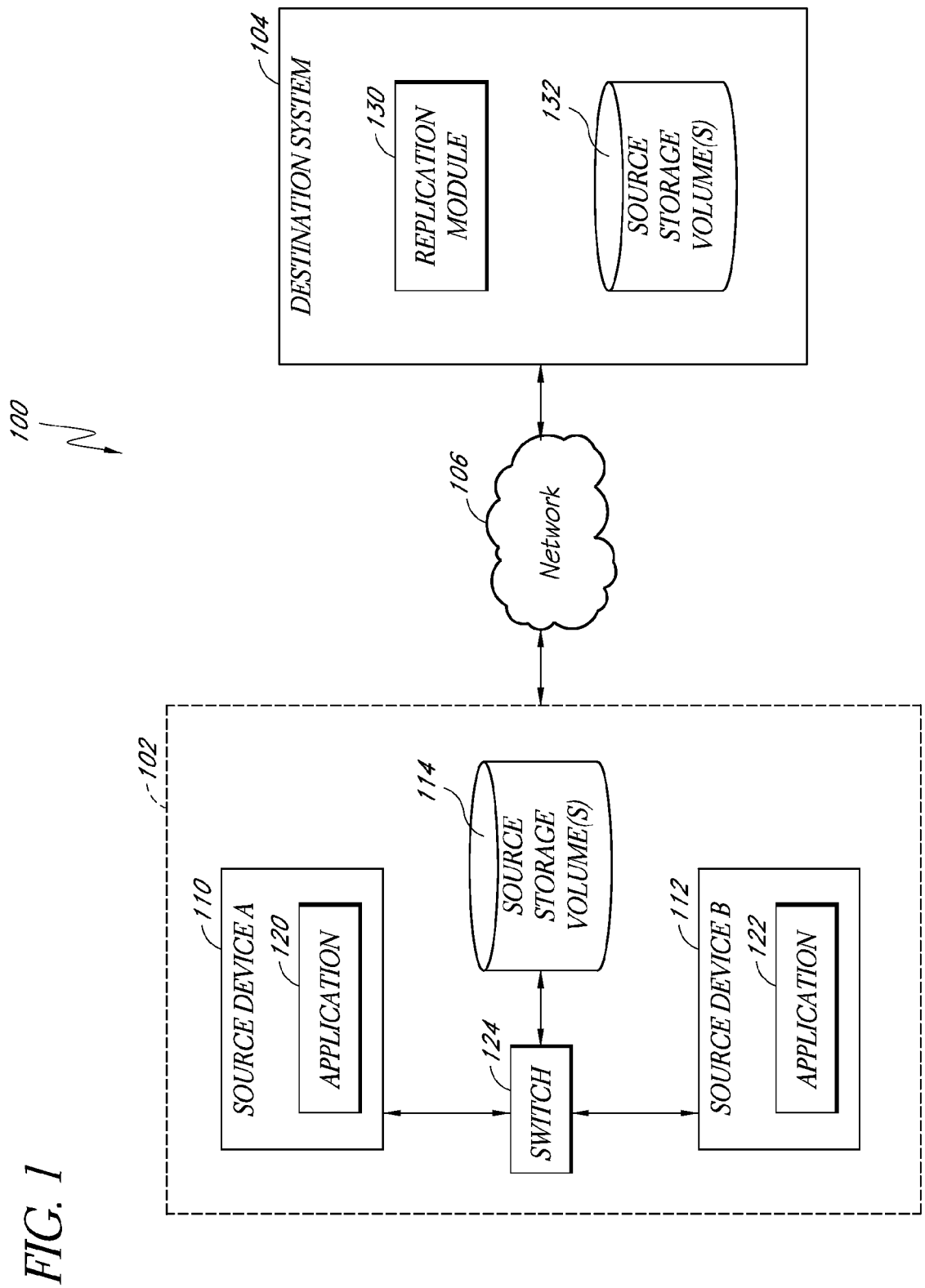
FIG. 1 illustrates a block diagram of a data replication system, according to certain embodiments of the invention.

As will be seen from the disclosure herein, certain systems and methods are provided for intelligent data replication. In particular, embodiments of the invention are capable of performing discrete replication of data from a source system to a destination system.

In certain embodiments, one or more modules executing on a shared storage device and/or at least one source system can monitor data modification operations to determine which files on the storage device change during a period of time. Using a mounted snapshot of the source data, the replication system can then detect which blocks of data were modified within the changed files and replicate these particular blocks to a destination volume.

In certain embodiments, the snapshot of the source volume reflects a known good, or recoverable, state of the application. For instance, replication systems and methods may determine appropriate points within the application data at which enough information is collected to reliably restore the application as of a particular point in time. At certain known good states, the replication system quiesces the application and/or generates a snapshot of the source data in order to perform the replication operations. Time information, such as, for example, a time stamp, can also be recorded to indicate the source system time of the application's known good state.

The destination system is further capable of performing one or more data management operations, such as, for example, storage operations (e.g., snapshot, backup), search operations, data classification, combinations of the same or the like, on the replicated data when it represents a known good state. Performing data management operations on the replicated data allows for the processing of copies of application data without significantly impacting the resources of the source system.

Moreover, using the time information, the destination system is further capable of logically associating the copied data (e.g., a snapshot of the replicated data) with the source system time of the known good state of the application. That is, even though the copy of the replicated data occurs at some point after the replication of the production (source system) data, the copied data is logically associated with the (earlier) source system time of the known good state of the application. As a result, the copy of the replicated data appears as if it was directly performed on the production data. In certain embodiments, this method advantageously allows for further processing of the copied data (e.g., processing of snapshots of the replicated data) without touching the production data.

The features of the systems and methods will now be described with reference to the drawings summarized above. Throughout the drawings, reference numbers are re-used to indicate correspondence between referenced elements. The drawings, associated descriptions, and specific implementation are provided to illustrate embodiments of the invention and not to limit the scope of the disclosure.

In addition, methods and processes described herein are not limited to any particular sequence, and the blocks or states relating thereto can be performed in other sequences that are appropriate. For example, described blocks or states may be performed in an order other than that specifically disclosed, or multiple blocks or states may be combined in a single block or state.

FIG. 1 illustrates a block diagram of a data replication system 100, according to certain embodiments of the invention. In general, embodiments of the data replication system 100 perform discrete data replication by copying changed blocks of data from within one or more files on a primary storage device. Such intelligent and focused data replication can advantageously reduce network loads, expedite copy operation and/or decrease valuable consumption of processing resources.

As shown, the data replication system 100 comprises a source (or primary) system 102 capable of communicating with a destination system 104 by sending and/or receiving data over a network 106. For instance, in certain embodiments, the destination system 104 receives and/or stores a replicated copy of at least a portion of data, such as application-specific data, associated with the source system 102.

The illustrated network 106 advantageously comprises any means for communicating data between two or more systems or components. In certain embodiments, the network 106 comprises a computer network. For example, the network 106 can comprise a public network such as the Internet, virtual private network (VPN), a token ring or TCP/IP based network, wide area network (WAN), local area network (LAN), an intranet network, point-to-point link, a wireless network, cellular network, wireless data transmission system, two-way cable system, interactive kiosk network, satellite network, broadband network, baseband network, combinations of the same or the like. In embodiments wherein the source system 102 and destination system 104 are part of the same computing device, the network 106 may represent a communications socket or other suitable internal data transfer path or mechanism.

As shown, the source system 102 comprises a shared file system configuration in which multiple source devices have shared access to data (e.g., production data) on the same storage volume(s). In particular, a source device A 110 and a source device B 112 both communicate with source (or primary) storage volume(s) 114 through a switch 124 to have read/write access to the production data. For example, in certain embodiments, the source system 102 comprises a clustered file system, a storage area network (SAN) system, combinations of the same or the like.

The source devices 110 and 112 can comprise any computing device capable of accessing and/or processing data on a storage volume. In certain embodiments, either or both of the source devices 110 and 112 comprises a server computer. In yet other embodiments, the source storage devices 110, 112 can comprise a workstation, a personal computer, a cell phone, a portable computing device, a handheld computing device, a personal digital assistant (PDA), combinations of the same or the like.

The source storage volume 114 can include any type of media capable of storing data. For example, the source storage volume 114 can comprise magnetic storage (such as a disk or a tape drive) or other type of mass storage. In certain embodiments, the source storage volume(s) 114 can comprise one or more storage volumes that include physical storage disks defining an overall logical arrangement of storage space. For instance, disks within a particular volume may be organized as one or more groups of redundant array of independent (or inexpensive) disks (RAID). In certain embodiments, the source storage volume(s) 114 can include multiple storage devices of the same or different media.

Although the source storage volume 114 is illustrated separate from both source devices 110, 112, it will be understood that at least a portion of the source storage volume(s) 114 can be internal and/or external (e.g., remote) to the source device A 110 and/or the source device B 112.

FIG. 1 further illustrates an application 120 residing and/or executing on the source device 110 and an application 122 residing and/or executing on the source device 112. In certain embodiments, either or both of the applications 120, 122 can comprise software applications that interact with a user to process data on the source storage volume 114 and may include, for example, database applications (e.g., SQL applications), word processors, spreadsheets, financial applications, management applications, e-commerce applications, browsers, combinations of the same or the like. For example, in certain embodiments, the applications 120, 122 can comprise one or more of the following: MICROSOFT EXCHANGE, MICROSOFT SHAREPOINT, MICROSOFT SQL SERVER, ORACLE, MICROSOFT WORD and LOTUS NOTES.

The switch 124 comprises software and/or hardware usable by multiple computing devices to access a shared storage device. For instance, the switch 124 can comprise a Fibre Channel switch or other type of network switch. In yet other embodiments, the shared storage can be arranged in a network file system, a network attached storage (NAS) system, combinations of the same or the like.

As further illustrated in FIG. 1, the destination system 104 comprises a replication module 130 and destination storage volume(s) 132. In certain embodiments, the replication module 130 is configured to monitor and/or manage the copying of data from the source system 102 to the destination system 104. In yet other embodiments, the replication module 130 comprises a "dumb" server or terminal that receives and executes instructions from the source system 102 and/or a storage management module (not shown).

The destination storage volume 132 may include any type of media capable of storing data, such as replication data sent from the source system 102. For example, the destination storage volume 132 may comprise magnetic storage or other type of mass storage. In certain embodiments, the destination storage volume 132 may be internal and/or external to the computing device(s) executing the replication module 130.

Although FIG. 1 illustrates the data replication system 100 having a shared storage configuration, other embodiments of the invention can include a single source device and/or each of multiple source devices can have separate, associated storage volumes.

Figure 2:
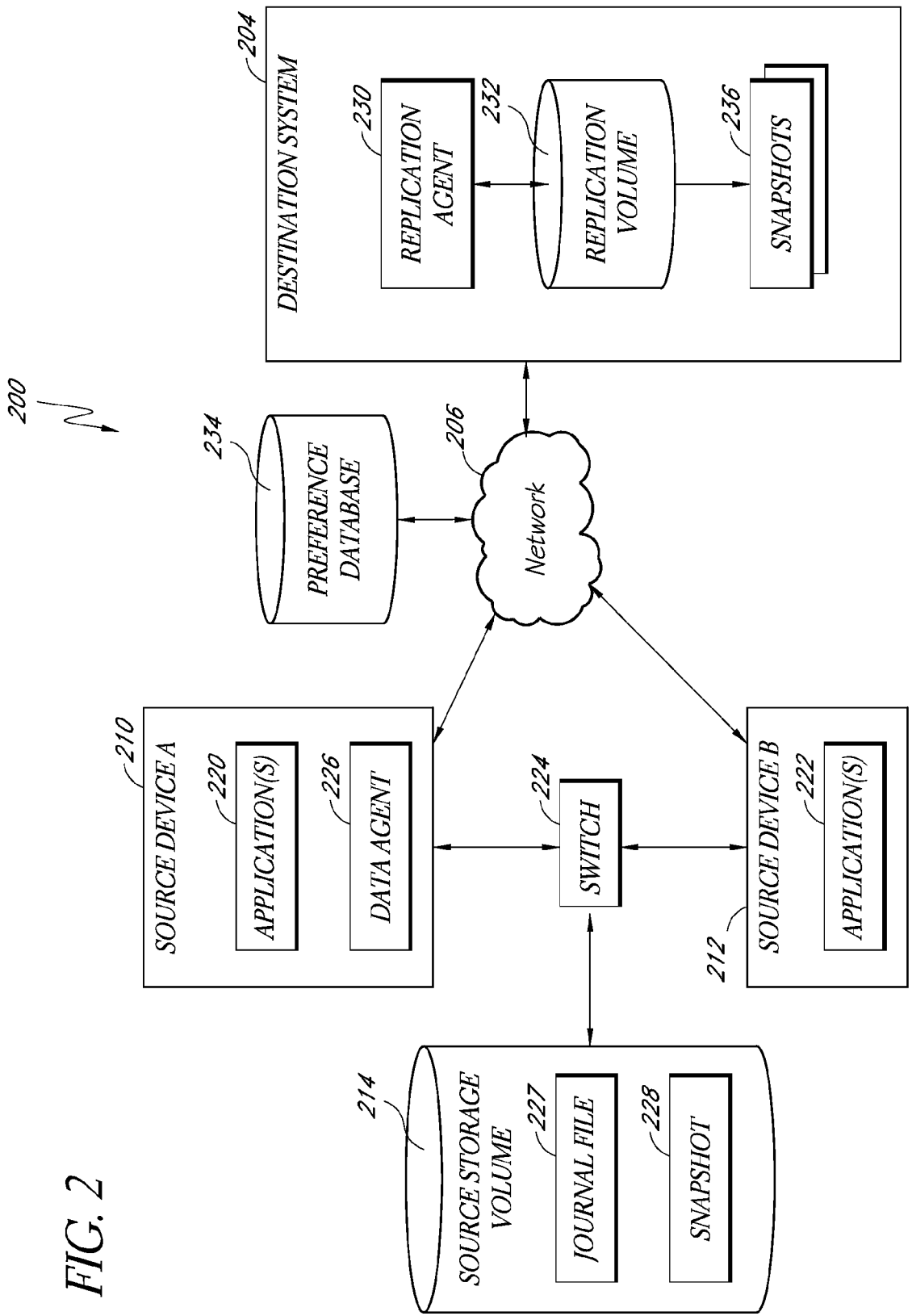
FIG. 2 illustrates a block diagram of an embodiment of the data replication system of FIG. 1.

FIG. 2 illustrates a block diagram of a data replication system 200, according to certain embodiments of the invention. In particular, the data replication system 200 illustrates further details of an embodiment of the replication system 100 of FIG. 1. Thus, to simplify the description, components will not be redescribed in detail if they were described above. Rather, the components in the embodiments of FIG. 2 will be given a reference numeral that retains the same last two digits as the reference numeral used in the embodiment of FIG. 1 and will be preceded with a numeral "2."

In general, the system 200 is configured to perform intelligent data replication of data on a shared storage volume. In certain embodiments, the data replication is performed at discrete points in time and comprises copying only changed blocks of data to a destination system. This process can be performed, for example, by comparing, on a block-by-block basis, modified files with corresponding files on a destination system. Moreover, the frequency of such replication can be adjusted to meet the needs of the user(s) and/or system.

As shown, the data replication system 200 comprises a source device A 210 and a source device B 212 that communicate with a destination system 204 over a network 206. In general, the data replication system 200 is configured to perform discrete data replication with respect to data stored on a shared source storage volume(s) 214, which is accessible by both source devices 210, 212.

Each of the source devices 210, 212 comprises application(s) 220 and application(s) 222, respectively, executing thereon. As illustrated, the application(s) 220, 222 are configured for shared access to the data on the source storage volume 214 through a switch 224.

The source device A 210 further comprises a data agent 226. In certain embodiments, the data agent 226 comprises a module responsible for performing data and/or storage tasks related to the source device A 210 and/or the source storage volume 214. For example, the data agent 226 can manage and/or coordinate the compilation and/or transferring of replication data from the source storage volume 214. In other embodiments, the data agent 226 may provide archiving, migrating, and/or recovery of client computer data.

In certain embodiments, the source device A 210 comprises a plurality of data agents 226, each of which performs data management operations related to data associated with each application. In yet other embodiments, the data agent 226 can work with data from multiple applications 220.

In certain embodiments, the data agent 226 is configured to perform data management operations in accordance with one or more "storage policies" or other preferences. For example, a storage policy can include a data structure or other information having a set of preferences and/or other storage criteria for performing a storage operation. The preferences and storage criteria may include, but are not limited to, information regarding storage locations, relationships between system components, network pathways, retention policies, data characteristics, compression or encryption requirements, preferred system components, combinations of the same or the like.

Although only a single data agent is illustrated with respect to the data replication system 200, other embodiments of the invention can utilize a data agent on each of a plurality of source devices (e.g., source device 212).

As further illustrated in FIG. 2, the source storage volume 214 further comprises a journal file 227. For instance, the journal file 227 can track data changes on a logical level, such as when a particular file has been changed or modified. In certain embodiments, the journal file 227 comprises a new technology file system (NTFS) change journal or other like file system change journal capable of detecting modifications made to files and/or data stored on the source storage volume 214.

In yet other embodiments, the journal file 227 can store copies or portions of some or all the data operations output from applications 220, 222 to the source storage volume 214. In yet other embodiments, the journal file entries can include other system information, such as time stamp information. In still other embodiments, the journal file entries may be enriched with other useful system or application information available on source devices 210, 212. For example, the journal file entries can include metadata and/or data classification information that has been obtained from the application data.

In certain embodiments of the invention, the journal file 227 can comprise a customized change journal that tracks in real-time the block-level changes made to data files stored on the source storage volume 214. Such embodiments could obviate the need for later performing comparison algorithms to detect which blocks of a modified file were affected by one or more data modification operations.

The source storage volume 214 also comprises one or more snapshots 228 that provide a static image of data on the source storage volume 214. In certain embodiments, the snapshot 228 captures a point-in-time, read-only image of the volume to detect changed files and/or blocks and to facilitate replication of data on the source storage volume 214.

Snapshots may be implemented by several different methods. For example, in certain embodiments, a "copy-on-write" process can be used. In yet other embodiments, the snapshot 228 can be generated using another process, such as, for example, direct-on-write, split mirror, copy-on-write with background copy, continuous data protection copies, combinations of the same or the like.

The destination system 204 further comprises a replication agent 230 in communication with a replication volume 232. In certain embodiments, the replication agent 230 comprises any computing device and/or software module that coordinates the transfer of data to the replication volume 232.

For instance, in certain embodiments, the replication agent 230 instantiates an appropriate number of threads, processes, or routines, for replicating data received from the source storage volume 214 to the replication volume 232. In certain embodiments, the replication agent 230 further includes mapping or correlation information that determines when and to where the data from the source storage volume 214 is copied by the threads. In certain embodiments, such mapping information may be based on system- or user-defined parameters and/or may be automatically generated, such as based on the status of the replication volume 232.

In certain embodiments, the replication agent 230 communicates with the data agent 226 to coordinate data replication. For example, the data agent 226 can open a socket and communicate to the replication agent 230 regarding the transfer of data. For instance, the data agent 226 may request from the replication agent 230 and/or other network management components information that may affect, or be related to, the correlation or mapping of network storage paths for replication data.

The illustrated data replication system 200 further comprises an optional preference database 234 in communication with the network 206. In certain embodiments, the preference database 234 includes storage policies and/or other preferences usable by the replication system 200 in managing data. For instance, the stored preferences may indicate the desired frequency at which data is to be replicated from the source storage volume 214 to the replication volume 232. The preference database 234 may also store path information for detailing to which location(s) on the replication volume 232 data should be copied. In yet other embodiments, the preference database 234 may include storage policies that dictate particular criteria for performing one or more data management operations on the data stored on the replication volume 232.

The replication system 200 advantageously provides for data management operations to be performed on replicated data in order to avoid burdening the source systems. For example, one or more storage operations may be performed on replicated data that represents a recoverable state, or "known good state" of a particular application(s) running on the source system(s).

For instance, in certain embodiments, known good replication copies may be viewed as copies of production volume data. This feature allows a management component in the computing system to directly access, copy, restore, backup or otherwise manipulate the replication copies of production data as if the data was the production data of the source storage volume 214. Such can advantageously improve various system performance characteristics such as access time, reducing memory requirements and reducing impact on source, or client, applications.

In certain embodiments, the replication copies of the production data include time information (such as one or more time stamps) that indicates the source system time when the production data was modified and/or when the subject application was in a known good state. Such time stamps are then associated with copies of the replicated data, thereby allowing for the synchronization of time references between the production data and copies of the replicated data.

For example, FIG. 2 illustrates one or more snapshots 236 associated with the replication volume 232. In certain embodiments, the snapshots 236 comprise point-in-time images of data stored on the replication volume 232. As a result, such snapshots 236 provide copies of the production data on the source system without affecting the performance thereof.

Figure 3:
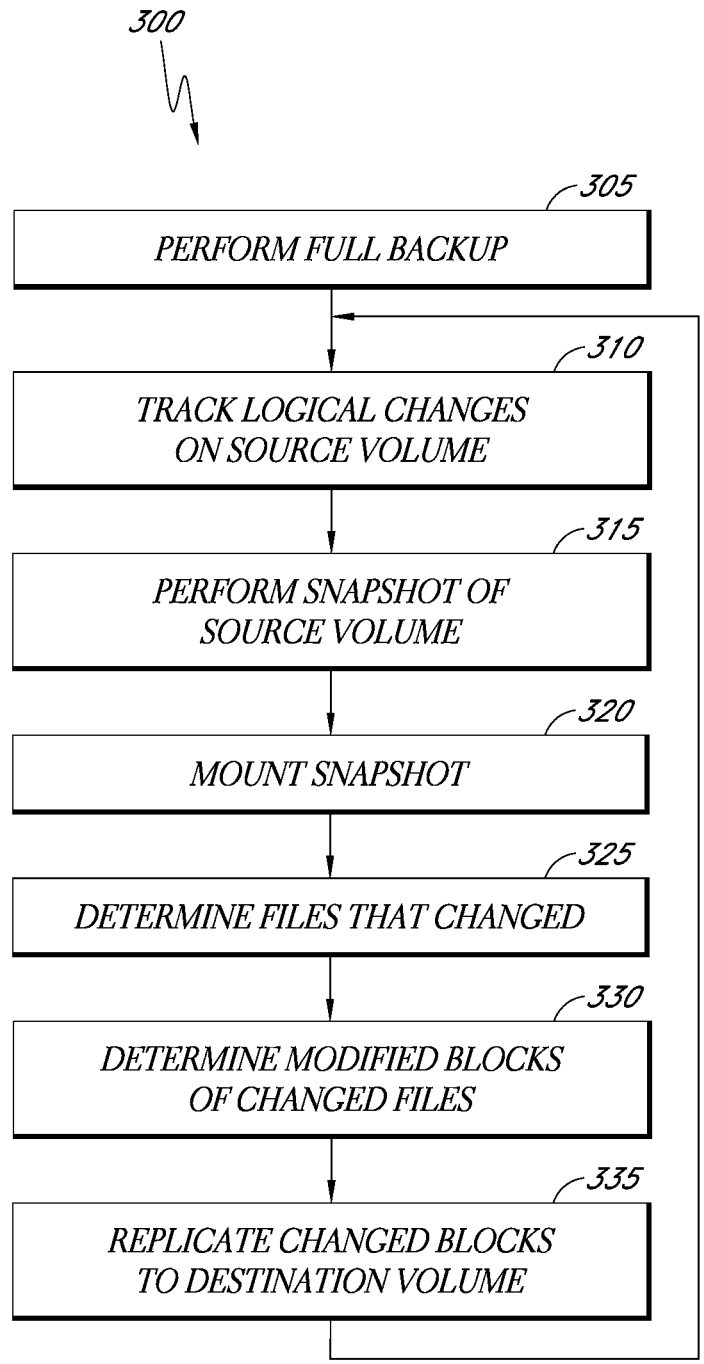
FIG. 3 illustrates a flowchart of an exemplary embodiment of a data replication process usable by the data replication system of FIG. 2.

FIG. 3 illustrates a flowchart of a data replication process 300, according to certain embodiments of the invention. In general, the replication process 300 is executed by embodiments of the data replication systems described herein to perform intelligent replication of data in a storage management environment. For exemplary purposes, the replication process 300 will be described hereinafter with reference to the components of the data replication system 200 of FIG. 2.

The replication process 300 begins with Block 305, during which the replication system 200 performs a full backup of data stored on the source storage volume 214. For instance, the full backup operation can comprise the copying of the entire file system on the source storage volume 214 to the replication volume 232. In other embodiments, the full backup can be directed to application-specific data or one or more particular files on the source storage volume 214.

In certain embodiments, the destination system 204 communicates with at least one of the source devices 210, 222 (e.g., with data agent 226) to verify that the source storage volume 214 and the replication volume 232 are synchronized following the full backup or related copy operation.

At Block 310, the journal file 227 tracks logical changes to data on the source storage volume 214. For instance, such changes can comprise modification of the data itself, attribute changes, security changes, combinations of the same or the like. In certain embodiments, the journal file 227 does not maintain a record of the actual change, but only which files were changed without storing additional information. Such embodiments can advantageously conserve memory and/or resources by maintaining relatively small amounts of data in the journal file 227.

At Block 315, the replication system 200 performs a snapshot of the source storage volume 214. In certain embodiments, this process is advantageously performed at a determined replication point, when synchronization of the source storage volume 214 and the replication volume 232 is desired. For example, in certain embodiments, the snapshot is performed in response to instructions received from the data agent 226. In yet other embodiments, the snapshot is performed in response to a call made by one of the source devices 210, 212 to a Microsoft Volume Shadow Copy Service (VSS) driver, a QSNAP driver, or other software-based snapshot implementation.

In certain embodiments, the snapshot of Block 315 can be triggered according to one or more storage policies, such as stored in the preference database 234, that dictate the timing of storage operations between the source storage volume 214 and the replication volume 232. For instance, replication points can be determined by preset copying intervals, time lapsed since the last copy/replication operation, thresholds reached in the journal file 227, replication agent 230 requests for a copy operation, user input, specific parameters or requirements associated with a particular application 220, 222, monitored and/or predicted health of the servers, combinations of the same or the like.

For instance, in certain embodiments, replication can be performed every eight hours, once a day, or the like. In yet other embodiments, certain data-sensitive application data may be copied more frequently than other applications in order to reduce the amount of potential data loss due to a failure occurring between copy operations.

In certain embodiments, during Block 315, writes to the source storage volume 214 are temporarily quiesced, buffered, or otherwise halted during the performance of the snapshot. Once the snapshot is complete, the writes to the source storage volume 214 can immediately resume.

At Block 320, the replication system 200 mounts the snapshot to present a full logical file system to the source devices 210, 212. In certain embodiments, this process comprises mounting or mapping a prepared disk volume onto a standard mount point or mount location, but with a special option that specifies the original file system. For instance, in certain embodiments of the invention, a data agent on either of the source devices 210, 212 can instruct the mounting of the snapshot of the source volume.

At Block 325, the replication process 300 accesses the journal file 227 in view of the mounted snapshot to determine which source files have changed between the time of the full backup (Block 300), or last re-sync, and the capturing of the snapshot (Block 315). In certain embodiments, the data agent on either of the source devices 210, 212 can access the journal file 227 to determine the changed files.

Moreover, in certain embodiments of the invention, the replication process 300 can utilize customized change journal filter drivers executing on each of the source devices 210, 212 to track writes to a given set of files. A list of all changed files can then be consolidated between the devices to determine which extents and/or files have changed during the select period of time. Such a consolidated list can be maintained on one or more source devices, the source storage volume, a storage management module, the replication agent 230 or the like.

Based on the changed files and the mounted snapshot, the replication process 300 then determines the particular blocks that were modified within the changed files (Block 330). In certain embodiments, the replication system 200 compares each modified file on the source storage volume 214 with the corresponding file on the replication volume 232. For instance, the replication system 200 can parse each modified file into chunks (e.g., 64 KB chunks) and compare the chunks with the corresponding destination file via a message-digest algorithm (e.g., MD5) or secure hash algorithm (e.g., SHA-1). In yet other embodiments, other types of checksum algorithms or means for comparison can be used.

At Block 335, the replication system 200 replicates only the changed blocks from the source storage volume 214 to the replication volume 232. Because only changed blocks of the file are replicated, as opposed to the entire file, the replication process 300 advantageously reduces the use of valuable processing power, replication time, and/or network bandwidth.

Following Block 335, the replication process 300 returns to Block 310 to track additional logical changes to files on the source storage volume 214.

Although the replication process 300 has been described with respect to particular arrangements, it will be understood that blocks of the replication process 300 can be combined, divided and/or executed in parallel. For instance, in certain embodiments, the replication system 200 continues to track logical changes to the source storage volume(s) (Block 310) during one or more of the Blocks 320-335.

Figure 4:
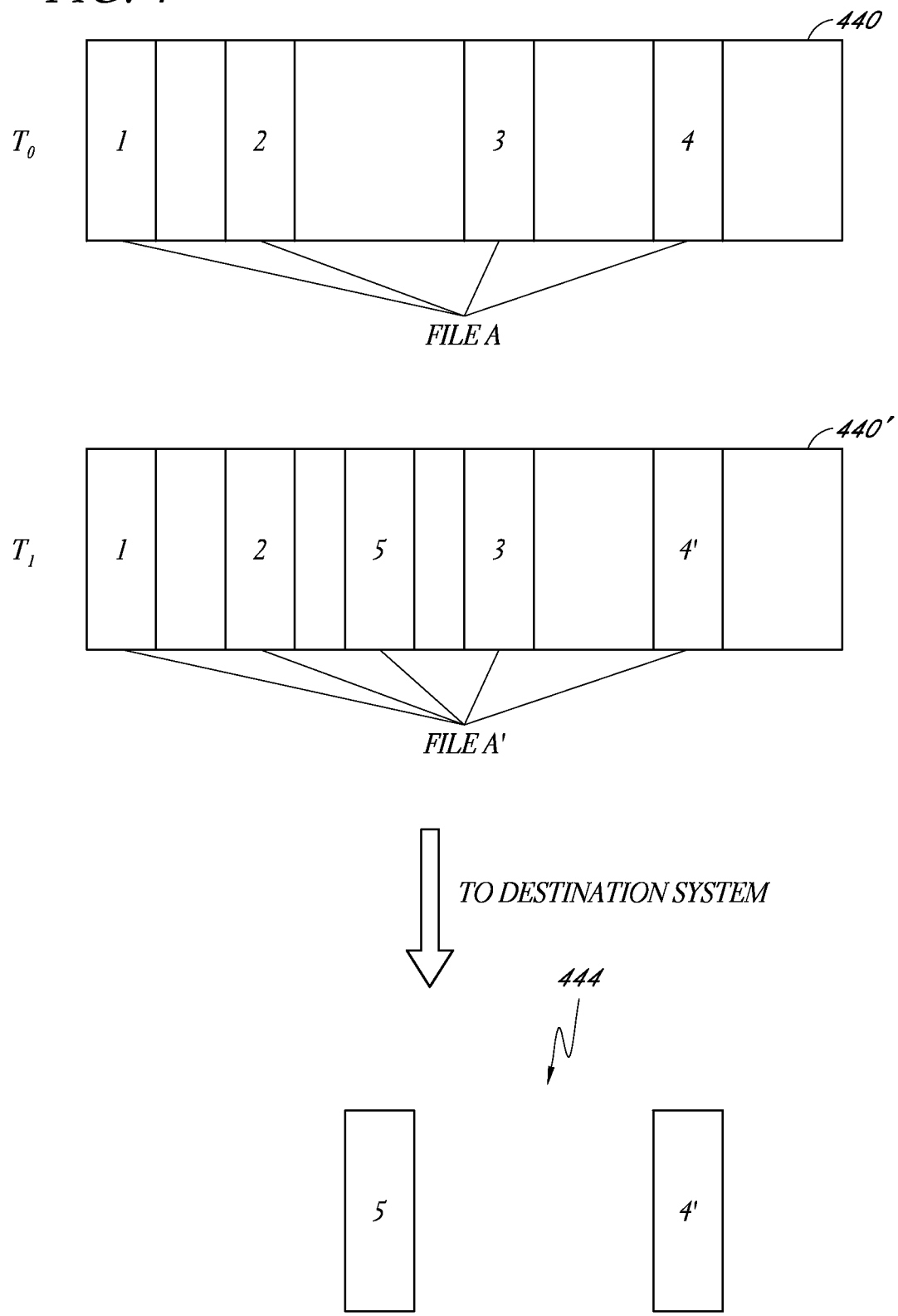
FIG. 4 illustrates a diagram of block level changes replicated from a single file, according to certain embodiments of the invention.

FIG. 4 illustrates a diagram of block level changes replicated from a single file, according to certain embodiments of the invention. As shown, at time $T_0$, File A is stored on a storage volume 440. In particular, File A comprises four blocks stored in non-contiguous memory locations on the storage volume 440. At this point, the storage volume 440 and a replication volume are preferably synchronized such that a corresponding copy of File A also exists on the replication volume.

Between time $T_0$ and $T_1$, changes are made to the data on the storage volume 440, thereby resulting in a storage volume 440' with, among other data, File A'. At this point, the journal file (e.g., NTFS change journal) of the particular storage volume indicates that File A' has been modified twice between time $T_0$ and $T_1$. In order to determine the specific changed blocks, File A' is compared with the file corresponding to File A on the replication volume, such as via Blocks 315-330 of the replication process 300 of FIG. 3. From this comparison, the replication system determines that block 4 has been modified to block 4' and that block 5 has been added to File A'.

Based on this comparison, only changed blocks 444 (i.e., blocks 4' and 5) are sent to the destination system to update the replication volume. Other unchanged blocks of File A', or other files, are not replicated.

Figure 5:
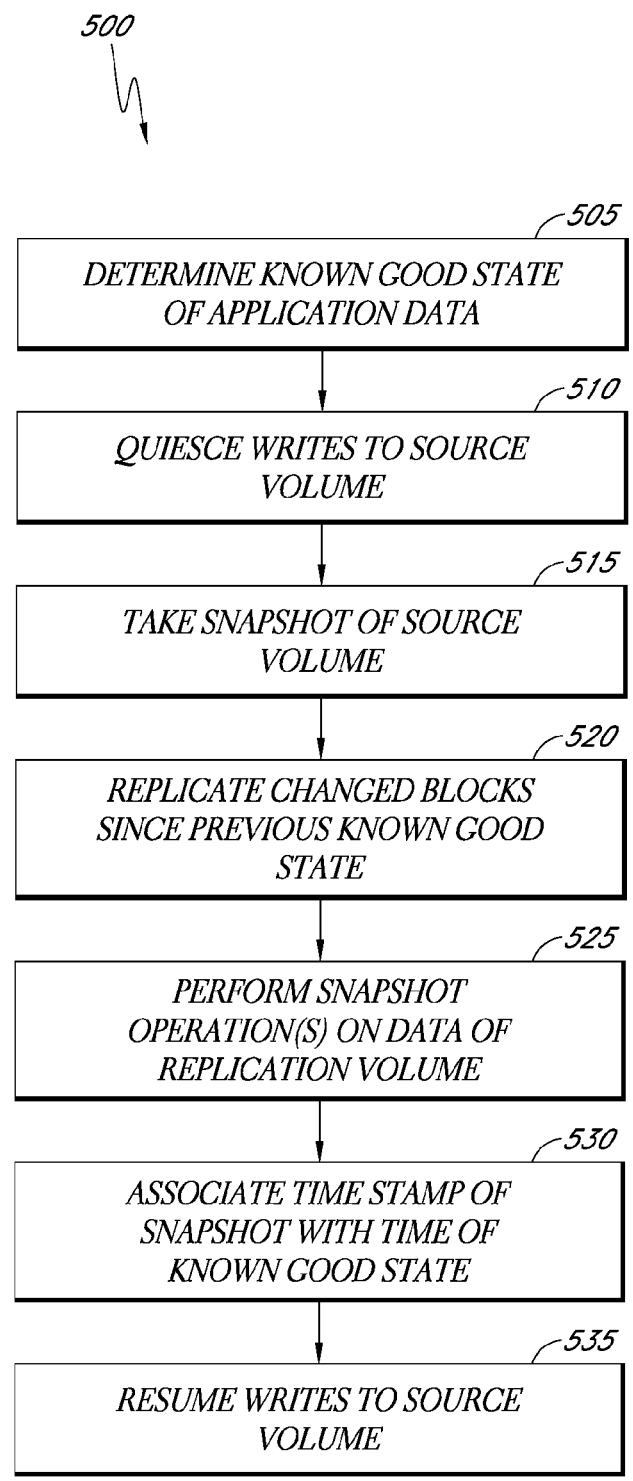
FIG. 5 illustrates a flowchart of an exemplary embodiment of another data replication process usable by the data replication system of FIG. 2.

FIG. 5 illustrates a flowchart of another data replication process 500, according to certain embodiments of the invention. In general, the replication process 500 is executed by embodiments of the data replication systems described herein to perform one or more storage operations on replicated data. For exemplary purposes, the replication process 500 will be described hereinafter with reference to the components of the data replication system 200 of FIG. 2.

At Block 505, the replication process 500 determines if application data on the source storage volume 214 is in a consistent or recoverable state. In certain embodiments, such a state may be defined as when particular computing operations of the respective application(s) 220, 222 are complete to a point such that further operation, recovery and/or rolling back of the application data may occur, based on the recorded data, without the loss of critical information or computing operations needed for operation of the application(s) 220, 222.

In certain embodiments, data agents residing on the source devices 210, 212 can determine if the particular application(s) associated with the data are in a known good state. At the known good state, write requests to the source storage volume 214 are quiesced (Block 510) and a snapshot is taken of the source storage volume 214 (Block 515). In yet other embodiments, the data agents can instruct the applications 220, 222 to place themselves in the known good state and to temporarily suspend data management operations to the source storage volume 214 in order to prepare for replication. For instance, in certain embodiments, the data agent utilizes the VSS driver or QSNAP driver to quiesce the applications 220, 222.

In certain embodiments, the data agent instructs the quiescing of the applications 220, 222 through an application programming interface (API). For instance, the data agent 226 may execute a command or process (e.g., FLRSNAP.TOOL) that causes the application 220 to quiesce. When the application 220 has placed itself in a known good state, the application 220 may send an acknowledgment to the data agent 226.

The frequency of known good states can vary and may depend on one or more system factors or user-selectable parameters. For instance, storage policies stored in one or more databases of the replication system 200 (e.g., the preference database 234) can dictate the frequency at which the discrete data replication process is performed. Moreover, it should be recognized that each point of data replication need not be performed at a known good state of the application. Rather, discrete data replication (including the taking of snapshots of the source storage volume 214) can also be performed when the source data is not in a known good state.

In certain embodiments, once the data management operations are suspended, the I/O buffers in the data path of the applications 220, 222 are flushed (and/or the writes in the queues are flushed). For example, some or all of the pending data management operations (e.g., as of the time of the quiescing of the application) may be allowed to complete and/or percolate through the data paths. In certain embodiments, this ensures that the snapshot 228 of the source storage volume 214 captures the application data in a known good state.

Notwithstanding the foregoing, it will be understood that, in certain embodiments, although applications 220, 222 are quiesced, they need not actually pause or suspend operation during the quiescent period. Rather, the applications 220, 222 may continue to operate substantially normally but may queue internally, or otherwise buffer, data management operations intended for the source storage volume 214. After the quiescent period, the buffered modification operations may be allowed to complete (i.e., be sent to the source storage volume 214).

In yet other embodiments, quiescing of the application 220 may be performed based on an automatic reporting procedure. For instance, a module of the replication system 200 may be configured to gather, receive and/or analyze information associated with a failure rate and/or health of applicable servers. Additional details of such status monitoring are provided in U.S. patent application Ser. No. 11/120,619, filed May 2, 2005, now U.S. Pat. No. 7,343,453, issued Mar. 11, 2008, which is hereby incorporated herein by reference in its entirety.

For example, the frequency of replication points may be selected or adjusted to mitigate risks detected in a storage network. In certain embodiments, one or more management components of the replication system 200 may identify a storage-related characteristic and may modify the frequency of replication points if the storage-related characteristic satisfies one or more particular risk criteria. For instance, risk criteria may be indicated by storage policies, storage definitions, a service level agreement ("SLA") or other information located in a management component database or other component of the replication system 200. In certain further embodiments, the frequency of replication points may be based at least in part on a level of data protection or data availability in the replication system 200.

The process 500 then replicates the blocks of data that have changed since the previous known good state (Block 520). For instance, in certain embodiments, the process 500 can follow Blocks 310-335 of the replication process 300 of FIG. 3. In certain embodiments, such replication further includes the transmission of time information indicative of the source system time of the known good state of the application data (e.g., time of replication point at which snapshot is taken of source storage volume 214). Such time information can be in the form of a time stamp, a log entry, or like information associated with a clock of the source system and/or source storage volume 214.

Because replication of the changed blocks can advantageously be performed at a time at which the source storage volume data is in a consistent state, Block 520 results in the data on the replication volume 232 also being in a consistent state. At Block 525, one or more storage operations can then be performed on the replicated data. For instance, the replication agent 230 or other module can cause a snapshot operation to be performed on the data of the replication volume 232.

At Block 530, the snapshot of the replicated data is associated with a time stamp representing the time of the known good state of the application(s). In certain preferred embodiments, when the snapshot, or other storage operation, is performed, the time of the snapshot is logically associated with the source system time of the known good state of the application data. For instance, a time stamp generated by the source system can be used to logically assign a "time" to the snapshot of the replicated data. In such a process, the snapshot of the replicated data then appears as if the snapshot was directly taken of the data in the source system.

In certain embodiments, the logical associations of time with respect to the snapshot 236 may be stored jointly with the snapshot and/or in a separate database. For instance, the logical time associations may be stored in an index on one or more replication volumes, on the replication agent 230, in the preference database 234, in a storage manager database index, by the data agent 226, combinations of the same or the like. In certain embodiments, stored jointly with the "updated" time data may also be the actual location of the snapshot 236 on the replication volume 232 or other storage device(s).

The process 500 also resumes writes to the source storage volume 214 (Block 535). In certain embodiments, Block 535 can be performed at any time after the snapshot is taken of the source storage volume 214 (Block 515). Thus, because the storage operations of Blocks 525 and 530 are performed on the replicated data of the replication volume 232, the production or primary data on the source storage volume 214 is not needed or affected by such operations. This also advantageously allows for writes to resume from the applications 220, 222 without needing to wait for performance of the one or more storage operations.

Although the replication process 500 has been described with reference to particular arrangements, various alternative embodiments can also be used. For instance, a wide variety of other storage operations other than, or in addition to snapshots, can be performed on the replication data, such as, but not limited to, creation, storage, retrieval, backup, migration, deletion, auxiliary copies, incremental copies, differential copies, hierarchical storage management ("HSM") copies, archive copies, information lifecycle management ("ILM") copies, other types of copies and versions of electronic data or the like.

In yet other embodiments, the replication system 200 may use the replication data to create a shadow version of the data on the source storage volume 214. In such embodiments, if there is a failure and/or overload of the source storage volume 214, the source devices 210, 212 can be redirected to the shadowed version of the data.

In yet other embodiments, different types of data management operations may be performed on the replication data depending on one or more schedule policies. For example, a snapshot storage operation may be scheduled to be performed on the replication data every five minutes, while a differential backup may be performed on the replication data every hour. Furthermore, a full backup may be scheduled to be performed once a day. Such scheduling policies may be advantageously determined to satisfy the needs of the user while reducing the impact on system resources.

FIG. 6 illustrates a block diagram of a data replication system 600 having a single source system, according to certain embodiments of the invention. In certain embodiments, the data replication system 600 can perform similar data replication processes as those described herein with reference to FIGS. 1-5, except that the system 600 does not comprise a clustered file system arrangement. Thus, to simplify the description, components of the replication system 600 will not be redescribed in detail if they were described above. Moreover, the components will be given a reference numeral that retains the same last two digits as the reference numeral used to describe the replication system 200 of FIG. 2 and will be preceded with a numeral "6."

As illustrated, the replication system 600 comprises a source system 602 that communicates with a destination system 604 over a network 606. In general, the data replication system 600 is configured to perform discrete data replication with respect to data stored on a source storage device 614.

The source system 602 further comprises application(s) 620 that access data stored on the source storage device 614. In certain embodiments, such access is via a file system that organizes files and directories accessible by the source system 602. The file system may include, for example, a local file system, a network file system, a file server, a management program or the like, or may include multiple file systems accessible by an operating system. For instance, in embodiments wherein the source storage device 614 is associated with multiple volumes, each volume may be associated with its own file system, or a single file system may span across the multiple volumes.

The source system 602 further comprises a data agent 626 responsible for performing data and/or storage tasks related to the source system 602. For example, the data agent 626 can manage and/or coordinate replication, archiving, migrating, and/or recovery of the source system data.

In certain embodiments, the source system 602 comprises a plurality of data agents 626, each of which performs data management operations related to data associated with each application. In such embodiments, each data agent 626 can monitor various files, folders, registry files and/or system resources that are impacted by a particular application. For instance, the data agent 626 can be programmed to detect data management requests by a particular application and determine which files, folders and/or system resources are associated with the data management requests. In yet other embodiments, the data agent 626 can work with data from multiple applications 620.

The source storage device 614 further comprises a journal file 627 that tracks when a particular file on the storage device has been changed or modified. In certain embodiments, the journal file 627 comprises a change journal or other journaling module as disclosed herein. In yet other embodiments, such tracking can be performed by the source system 602, such as through the data agent 626 and/or a filter driver on the source system 602. Examples of such tracking are described in more detail in U.S. patent application Ser. No. 11/640,829, filed Dec. 18, 2006, now U.S. Pat. No. 7,617,262, issued Nov. 10, 2009, which is hereby incorporated herein by reference in its entirety.

As further illustrated, the source storage device 614 also comprises one or more snapshots 628 or other means for providing a point-in-time image of the data on the source storage device 614.

The destination system 604 comprises a replication agent 630 in communication with a replication volume 632. In certain embodiments, the replication agent 630 comprises any computing device and/or software modules that coordinate the transfer of data to the replication volume 632. The illustrated data replication system 600 further comprises an optional preference database 634 in communication with the network 606.

Like certain replication systems disclosed herein, the replication system 600 is configured to perform intelligent data replication of data on a storage volume. In certain embodiments, the data replication is performed at discrete points in time and comprises copying only changed blocks of data to a destination system. This process can be performed, for example, by comparing, on a block-by-block basis, modified files with corresponding files on a destination system (e.g., via the replication processes 300, 500).

Although data replication systems have been disclosed herein with reference to certain embodiments, other embodiments can take on different arrangements or include more or fewer components without departing from the scope of the disclosure. For example, any of the replication systems 100, 200 or 600 can further include a storage manager that communicates with source and replication systems (e.g., through a network).

In certain embodiments, the storage manager is a software module or application configured to direct the performance of one or more storage operations and, in particular, the replication of data from the source system(s) to the replication system(s). In further embodiments, the storage manager may perform one or more of the operations or functions described above with respect to the data agents and/or the replication agents. For instance, the storage manager may direct and/or coordinate the performance of one or more storage operations on replicated data (e.g., snapshots of the replicated data).

In certain embodiments, the storage manager maintains an index, such as in a cache, for storing information relating to: logical relationships and associations between components of the replication systems, user preferences, management tasks, and/or other useful data. For example, the storage manager may use its index to track the location and timestamps of one or more snapshots of the replicated data.

The storage manager may also use its index to track the status of data management operations to be performed, storage patterns associated with the system components such as media use, storage growth, network bandwidth, Service Level Agreement ("SLA") compliance levels, data protection levels, storage policy information, storage criteria associated with user preferences, retention criteria, storage operation preferences, and other storage-related information. The index may typically reside on the storage manager's hard disk and/or other database.

In other embodiments, the storage manager may alert the user or system when a particular resource of the replication system is unavailable or congested or when components are unavailable due to hardware failure, software problems, or other reasons. In certain embodiments, the storage manager may utilize replication system data to suggest solutions to such problems when they occur or even before they occur. For example, the storage manager might alert the user that a storage device in the replication system was full or otherwise congested, and then suggest, based on job and data storage information contained in its index cache, an alternate storage device. In yet further embodiments, the storage manager or other system component may take action to remedy the problem at issue. For example, the storage manager may perform load balancing, error correction, or the like, based on information received regarding the replication system.

Moreover, the storage manager may include an interface agent module (not shown). In certain embodiments, the interface agent module may provide presentation logic, such as a graphical user interface ("GUI"), an API, or other interface by which users and system processes may be able to retrieve information about the status of storage operations and issue instructions to the replication systems regarding the performance of storage operations. For example, a user may modify the schedule of a number of pending snapshot copies or other types of copies. As another example, a user may use the GUI to view the status of all storage operations currently pending in the replication system or the status of particular components in the replication system.

Additional details of storage manager modules useful with embodiments of the replication systems disclosed herein are described in U.S. Pat. No. 7,389,311, issued Jun. 17, 2008, which is hereby incorporated herein by reference in its entirety.

Moreover, in certain embodiments of the invention, data replication systems and methods may be used in a modular storage management system, embodiments of which are described in more detail in U.S. Pat. No. 7,035,880, issued Apr. 5, 2006, which is hereby incorporated herein by reference in its entirety. For example, the data replication system may be part of a storage operation cell that includes combinations of hardware and software components directed to performing storage operations on electronic data. Exemplary storage operation cells usable with embodiments of the invention include CommCells as embodied in the SIMPANA, QNET, and/or QINETIX storage management systems by. CommVault Systems, Inc. (Oceanport, N.J.), and as further described in U.S. Pat. No. 7,454,569, issued Nov. 18, 2008, which is hereby incorporated herein by reference in its entirety.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein.

Embodiments of the invention are also described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flowchart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flowchart and/or block diagram block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide steps for implementing the acts specified in the flowchart and/or block diagram block or blocks.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method for replicating data in a computer network from a source storage device to a destination storage device, the method comprising:
   replicating at a first time source data by copying the source data to create replication data,
      wherein the source data is stored on at least one source storage device associated with a source system, the source system comprising one or more source computer devices, the source data comprising a plurality of source files generated by one or more applications executing on the source system, and
      wherein the replication data is stored on at least one destination storage device associated with a replication system comprising one or more replication computer devices, wherein the one or more replication computer devices are different than the one or more source computer devices, the replication data comprising a plurality of destination files corresponding to the plurality of source files;
   following the replicating, identifying, by the source system, changed source files by tracking at a logical file level which of the plurality of source files changed between the first time and a second time after the first time, wherein said tracking comprises maintaining a journal file on the source storage device with entries identifying the changed source files at the logical file level;
   providing from the source system to the replication system, the changed source files at the logical file level by mounting the changed source files on the replication system wherein the replication system uses the mounting to obtain the logical file level associated with the changed source files;
   using the one or more replication computer devices associated with the replication system to identify, based on the changed source files at the logical file level, previously replicated destination files that are related to the changed source files;
   performing with one or more of the source computer devices associated with the source system, a source snapshot of the source data to capture a point-in-time copy of the source data on a block-by-block basis at the second time;
   accessing, with the one or more replication computer devices associated with the replication system, data blocks in the source snapshot with the mounting;
   comparing, with the one or more replication computer devices associated with the replication system, the data blocks in the source snapshot with data blocks in the previously replicated destination files stored on the at least one destination storage device on a block-by-block basis to identify changed blocks in the changed source files in the source data;
   replicating, with the one or more replication computer devices associated with the replication system, the changed blocks of the changed source files by determining with the one or more replication computer devices which copies of the changed data blocks to replicate from the source system to the at least one destination storage device; and
   not replicating unchanged blocks associated with the changed source files.

2. The method of claim 1, additionally comprising, prior to performing the snapshot, quiescing one or more applications having access to the source data on the source storage device.

3. The method of claim 2, wherein said quiescing is performed at a known good state of the one or more applications.

4. The method of claim 2, additionally comprising instructing the one or more applications to assume a known good state.

5. The method of claim 1, wherein the source storage device comprises a shared storage device.

6. The method of claim 1, additionally comprising transmitting with the changed blocks time information indicative of the second time, wherein the time information is relative to a clock associated with the source storage device.

7. The method of claim 6, additionally comprising, following said replicating the changed blocks:
   performing a storage operation on the replication data to generate copied data; and
   logically associating the copied data with the time information indicative of the second time.

8. The method of claim 1, wherein the duration between the first time and the second time is based on a storage policy stored in a preference database.

9. A system for performing data replication in a computer network environment, the data replication from a first storage device to a replication storage device, the system comprising:
   a source system comprising one or more source computer devices and at least a first storage device configured to store source data as a plurality of source files, the source system having one or more applications executing thereon and operative to write data to the plurality of source files stored on the first storage device;
   a replication system comprising one or more replication computer devices, wherein the one or more replication computer devices are different than the one or more source computer devices, the replication system configured to store replication data that is a replication of the source data at a first time, the replication data stored on at least one replication storage device associated with the replication system, the replication data comprising a plurality of destination files corresponding to the plurality of source files
   a journal module configured to identify changed source files at a logical file level by tracking changes at the logical file level to the plurality of source files on the first storage device between a first time and a second time after the first time, the journal module tracking the changes at least partly by maintaining a journal file with entries identifying changed source files at the logical file level; and
   wherein the replication system receives a copy of the changed source files at the logical file level by mounting the changed source files on the replication system wherein the replication system uses the mounting to obtain the logical file level associated with the changed source files;
   a data agent module configured to execute on one or more of the first plurality of computer devices, the data agent module further configured to:

instruct a creation of a source snapshot of the source data with the one or more source computer devcies to capture a point-in-time copy of the source data on a block-by-block basis at the second time;

wherein the one or more replication computer devices associated with the replication system identify, based on the changed source files at the logical file level, the replication system identifies previously replicated destination files that are related to the changed source files;

the one or more replication computers devices associated with the replication system accesses data blocks in the source snapshot with the mounting;

the one or more replication computer devices associated with the replication system compares the data blocks in the source snapshot with data blocks in the replicated destination files stored on the at least one destination storage device on a block-by-block basis to identify changed blocks in the changed source files in the source data; and the one or more replication computer devices associated with the replication system replicates the changed blocks of the changed source files to the replication copy on the replication storage device by determining with the one or more replication computer devices which copies of the changed data blocks to replicate from the source system to the at least one destination storage device and which unchanged blocks associated with the changed source files are not replicated.

10. The system of claim 9, wherein the first storage device is a shared storage device.

11. The system of claim 10, wherein the journal module comprises a new technology file system (NTFS) change journal.

12. The system of claim 9, wherein the changed blocks are identified using a secure hash algorithm.

13. The system of claim 9, wherein the source data consists essentially of application-specific data.

14. The system of claim 9, wherein the replication system further comprises a replication module in communication with the replication storage device, the replication module being in network communication with the data agent.

15. The system of claim 14, wherein the replication module is further configured to direct a storage operation to be performed on at least a portion of the replication files to generate copied data.

16. The system of claim 15, wherein the replication module is further configured to logically associate the copied data with a time stamp indicative of the second time.

17. The system of claim 16, wherein the second time identifies a time at which the source data is in a known good state.

* * * * *